United States Patent
Yasui et al.

(10) Patent No.: US 10,227,940 B2
(45) Date of Patent: Mar. 12, 2019

(54) CONTROL DEVICE FOR INTERNAL COMBUSTION ENGINE

(75) Inventors: Yuji Yasui, Saitama (JP); Hideki Matsunaga, Saitama (JP); Hans Hardam, Tokyo (JP); Toshiharu Takahashi, Tokyo (JP); Masatoshi Yamada, Tokyo (JP); Hiroshi Uike, Tokyo (JP)

(73) Assignees: HONDA MOTOR CO., LTD., Tokyo (JP); DELPHI INTERNATIONAL OPERATIONS LUXEMBOURG S.A.R.L., Luxembourg (LU)

( * ) Notice: Subject to any disclaimer, the term of this patent is extended or adjusted under 35 U.S.C. 154(b) by 337 days.

(21) Appl. No.: 14/415,038

(22) PCT Filed: Jul. 17, 2012

(86) PCT No.: PCT/JP2012/068125
§ 371 (c)(1),
(2), (4) Date: Jan. 15, 2015

(87) PCT Pub. No.: WO2014/013553
PCT Pub. Date: Jan. 23, 2014

(65) Prior Publication Data
US 2015/0211427 A1    Jul. 30, 2015

(51) Int. Cl.
*F02D 41/02*    (2006.01)
*F02D 41/14*    (2006.01)
(Continued)

(52) U.S. Cl.
CPC ....... *F02D 41/0235* (2013.01); *F01N 3/2066* (2013.01); *F02D 41/005* (2013.01);
(Continued)

(58) Field of Classification Search
CPC ..... F02D 2041/1401; F02D 2041/1423; F02D 2041/1431; F02D 2041/1433; F02D 2041/1444; F02D 2041/1456
(Continued)

(56) References Cited

U.S. PATENT DOCUMENTS 4,792,905 A * 12/1988 Sekozawa ............. F02D 41/047
                                                        123/478
5,269,271 A * 12/1993 Kawai ................... F02D 31/005
                                                        123/339.11
(Continued)

FOREIGN PATENT DOCUMENTS

JP       08-234807 A      9/1996
JP     2009-293585 A     12/2009
(Continued)

OTHER PUBLICATIONS

International Search Report dated Sep. 4, 2012 corresponding to International Patent Application No. PCT/JP2012/068125 and English translation thereof.

*Primary Examiner* — John Zaleskas
(74) *Attorney, Agent, or Firm* — Squire Patton Boggs (US) LLP

(57) ABSTRACT

The objective of the present invention is to provide a control device for an engine that enables precise control of the equivalence ratio. The system from the fuel injection amount to the output from a LAF sensor is modeled as an injection amount-sensor output model by means of a model equation containing model parameters and a lag coefficient. The system from the equivalence ratio to the LAF sensor output is modeled as a port equivalence ratio-sensor output model by means of a model equation containing the lag coefficient. The control device is equipped with: a feedback-use identifier that successively identifies values for the model parameters; a LAF lag compensation-use identifier that succes- (Continued)

sively identifies values for the lag coefficient; and a stoichiometric driving mode controller that determines the value of a fuel injection amount.

8 Claims, 28 Drawing Sheets

(51) Int. Cl.
*F01N 3/20* (2006.01)
*F02D 41/00* (2006.01)
(52) U.S. Cl.
CPC ..... *F02D 41/1402* (2013.01); *F02D 41/1444* (2013.01); *F02D 41/1456* (2013.01); *F02D 2041/1423* (2013.01); *F02D 2041/1431* (2013.01); *F02D 2041/1433* (2013.01); *F02D 2200/0802* (2013.01); *Y02T 10/24* (2013.01); *Y02T 10/47* (2013.01)
(58) Field of Classification Search
USPC .............. 123/478, 480, 672, 673, 674, 679; 701/103, 104, 109; 60/276, 285
See application file for complete search history.

(56) References Cited

U.S. PATENT DOCUMENTS

| | | | | |
|---|---|---|---|---|
| 5,448,978 A * | 9/1995 | Hasegawa | ............. | F02D 41/008 123/478 |
| 5,632,261 A * | 5/1997 | Maki | ................... | F02D 41/1402 123/674 |
| 5,636,621 A * | 6/1997 | Maki | ................... | F02D 41/1402 123/480 |
| 5,651,341 A * | 7/1997 | Harada | ............... | F02D 41/1402 123/339.2 |
| 5,755,212 A * | 5/1998 | Ajima | ................. | F02D 41/1405 123/674 |
| 5,845,490 A * | 12/1998 | Yasui | ................. | F02D 41/1403 123/674 |
| 5,845,491 A * | 12/1998 | Yasui | ................. | F02D 41/1403 123/674 |
| 5,852,930 A * | 12/1998 | Yasui | ................. | F02D 41/1403 123/674 |
| 5,880,952 A * | 3/1999 | Yasui | ................. | F02D 41/1403 700/28 |
| 5,924,281 A * | 7/1999 | Yasui | ................. | F02D 41/1403 123/674 |
| 5,934,249 A * | 8/1999 | Nanba | ................. | F02D 41/0052 123/350 |
| 5,946,906 A * | 9/1999 | Akazaki | ................. | F02M 26/15 60/276 |
| 6,079,205 A * | 6/2000 | Yasui | ..................... | G05B 21/02 123/674 |
| 6,082,099 A * | 7/2000 | Yasui | ................... | F02D 41/008 123/674 |
| 6,082,345 A * | 7/2000 | Ikeuchi | ............... | F02D 41/1494 123/688 |
| 6,097,989 A * | 8/2000 | Maki | ...................... | F02D 41/047 700/37 |
| 6,112,517 A * | 9/2000 | Yasui | ................. | F02D 41/1403 123/674 |
| 6,125,831 A * | 10/2000 | Yasui | ................... | F02D 41/1402 123/674 |
| 6,188,953 B1 * | 2/2001 | Yasui | ................... | F02D 41/1402 123/674 |
| 6,230,486 B1 * | 5/2001 | Yasui | ................... | F02D 41/1402 123/674 |
| 6,256,983 B1 * | 7/2001 | Yasui | ................. | G05B 13/047 123/674 |
| 6,266,605 B1 * | 7/2001 | Yasui | ................ | G05B 13/0255 60/276 |
| 6,292,739 B1 * | 9/2001 | Yasui | ................... | F02D 41/008 60/276 |
| 6,327,850 B1 * | 12/2001 | Yasui | ................... | F02D 41/0082 123/692 |
| 6,367,245 B1 * | 4/2002 | Yasui | ..................... | F01N 3/0807 60/276 |
| 6,370,473 B1 * | 4/2002 | Yasui | ................... | F02D 41/0082 123/692 |
| 6,397,830 B1 * | 6/2002 | Dohta | ................. | F02D 41/1402 123/674 |
| 6,427,438 B1 * | 8/2002 | Yasui | ....................... | F01N 11/00 60/274 |
| 6,449,944 B1 * | 9/2002 | Yasui | .................... | F01N 11/007 60/274 |
| 6,477,458 B1 * | 11/2002 | Yasui | ...................... | F01N 11/00 123/692 |
| 6,711,891 B2 * | 3/2004 | Kitamura | ............... | F01N 11/007 60/276 |
| 6,868,326 B2 * | 3/2005 | Yasui | ................... | F02D 41/1403 123/672 |
| 2001/0013335 A1 * | 8/2001 | Hosokawa | .......... | F02D 41/0002 123/478 |
| 2002/0005192 A1 * | 1/2002 | Dohta | .................. | F02D 41/1402 123/674 |
| 2002/0029561 A1 * | 3/2002 | Ueno | .................... | F01N 11/007 60/277 |
| 2002/0049526 A1 * | 4/2002 | Kawai | ................. | F02D 41/1401 701/104 |
| 2002/0133287 A1 * | 9/2002 | Dohta | ................... | F02D 41/047 701/104 |
| 2002/0143460 A1 * | 10/2002 | Yasui | .................. | F02D 41/1402 701/106 |
| 2002/0173901 A1 * | 11/2002 | Yoshizawa | .......... | F02D 41/0295 701/109 |
| 2003/0023328 A1 * | 1/2003 | Yasui | .................. | F02D 41/0235 700/28 |
| 2003/0033075 A1 * | 2/2003 | Yasui | .................. | F02D 41/1402 701/109 |
| 2003/0065438 A1 * | 4/2003 | Katoh | ................. | F02D 41/1403 701/104 |
| 2003/0066518 A1 * | 4/2003 | Katoh | ................. | F02D 41/1403 123/672 |
| 2003/0101975 A1 * | 6/2003 | Yoshizawa | .......... | F02D 41/1403 123/674 |
| 2003/0114979 A1 * | 6/2003 | Yoshizawa | .......... | F02D 41/1402 701/109 |
| 2003/0125865 A1 * | 7/2003 | Yasui | .................. | F02D 41/0235 701/109 |
| 2003/0140617 A1 * | 7/2003 | Yasui | .................. | F02D 41/1403 60/276 |
| 2003/0154953 A1 * | 8/2003 | Yasui | .................. | F02D 41/1479 123/205 |
| 2004/0000493 A1 * | 1/2004 | Yasui | .................. | F02D 41/222 205/775 |
| 2004/0040283 A1 * | 3/2004 | Yasui | .................... | F02D 41/126 60/276 |
| 2004/0050034 A1 * | 3/2004 | Yasui | .................. | F02D 41/1403 60/276 |
| 2004/0094138 A1 * | 5/2004 | Yasui | .................. | F02D 41/1402 123/688 |
| 2004/0103890 A1 * | 6/2004 | Yasui | .................. | F02D 41/0085 123/673 |
| 2004/0158387 A1 * | 8/2004 | Yasui | .................. | F02D 41/1402 701/108 |
| 2004/0163380 A1 * | 8/2004 | Yasui | .................. | F02D 41/1401 60/285 |
| 2004/0193358 A1 * | 9/2004 | Yasui | ....................... | F01N 9/005 701/109 |
| 2004/0199323 A1 * | 10/2004 | Mizuno | .................... | B62D 1/28 701/109 |
| 2005/0075781 A1 * | 4/2005 | Mizuno | ................. | F02D 41/008 701/109 |
| 2007/0168054 A1 * | 7/2007 | Yasui | .................. | F02D 41/1406 700/31 |
| 2009/0157282 A1 * | 6/2009 | Asano | ................. | F02D 41/1403 701/109 |

(56) References Cited

U.S. PATENT DOCUMENTS

| | | | | |
|---|---|---|---|---|
| 2012/0095658 A1* | 4/2012 | Yasui | ................ | F02D 41/1403 |
| | | | | 701/60 |
| 2012/0116545 A1* | 5/2012 | Yasui | ................ | G05B 13/042 |
| | | | | 700/30 |
| 2015/0167570 A1* | 6/2015 | Yasui | ................ | F01N 3/2066 |
| | | | | 123/674 |

FOREIGN PATENT DOCUMENTS

| | | |
|---|---|---|
| JP | 2012-088866 A | 5/2012 |
| JP | 2012-098989 A | 5/2012 |
| JP | 2012-127356 A | 7/2012 |

\* cited by examiner

CONTROL DEVICE FOR INTERNAL COMBUSTION ENGINE

TECHNICAL FIELD

The present invention relates to an exhaust purification system for an internal combustion engine.

BACKGROUND ART

The exhaust purification system for an internal combustion engine purifies HC (hydrocarbons), CO (carbon monoxide) and NOx (nitrogen oxides) contained in the exhaust gas of the engine. For exhaust purification systems, those using reactions on various types of catalysts provided in the exhaust passage to purify the above-mentioned three-way components in exhaust gas have become mainstream. In the catalysts purifying the exhaust gas, various catalyst have been proposed that have different functions such as an oxidation catalyst (DOC (Diesel Oxidation Catalyst)), three-way catalyst (TWC (Three-Way Catalyst)), NOx storage reduction-type catalyst (NSC (NOx Storage Catalyst)), and selective reduction catalyst (SCR catalyst (Selective Catalytic Reduction Catalyst)).

The oxidation catalyst has an oxidizing function for purifying HC and CO, by causing the oxidation reaction of HC and CO to progress under exhaust gas with the equivalence ratio of the air/fuel mixture made lean to abundantly contain oxygen (exhaust gas of lean equivalence ratio). In addition, this oxidation catalyst also includes a three-way purification function whereby the oxidation reaction of HC and CO and the reduction reaction of NOx simultaneously progress at high efficiency under exhaust gas with the equivalence ratio of the air-fuel mixture made stoichiometric (exhaust gas of stoichiometric equivalence ratio). The three-way catalyst corresponds to a catalyst made by adding an oxygen storage material (OSC material) to the above-mentioned oxidation catalyst, and when comparing with the above-mentioned oxidation catalyst, the three-way purification window, i.e. the equivalence ratio width exhibiting the three-way purification function, becomes wider. This effect occurs from the width of the catalyst internal air-fuel ratio fluctuation relative to the fluctuation of the pre-catalyst air-fuel ratio decreasing by way of the oxygen storage effect of the OSC material.

The selective reduction catalyst reduces NOx under the presence of a reducing agent supplied externally such as $NH_3$ or HC, or existing in the exhaust gas. The NOx storage reduction-type catalyst stores NOx in the exhaust gas under exhaust gas of lean equivalence ratio, and reduces the NOx stored under the exhaust gas of stoichiometric or richer than stoichiometric equivalence ratio by way of the reducing agent. The exhaust purification system of an engine based on lean combustion, such as a lean combustion-type gasoline engine or diesel engine, often uses a catalyst called a DeNOx catalyst such as this selective reduction catalyst or NOx storage reduction-type catalyst, in order to ensure the NOx purification performance under exhaust gas of lean equivalence ratio, by combining with the aforementioned such oxidation catalyst or three-way catalyst.

Patent Document 1 presents an exhaust purification system combining, among the above such catalysts, the NOx storage reduction catalyst and three-way catalyst. This exhaust purification system sets the equivalence ratio of the air-fuel mixture to stoichiometric prior to the NOx storage reduction-type catalyst reaching activation, and purifies the three-way components of exhaust gas by way of the three-way catalyst mainly. In addition, this exhaust purification system sets the equivalence ratio of the air-fuel mixture to lean after the NOx storage reduction-type catalyst has reached activation, and purifies HC and CO with the three-way catalyst, as well as purifying NOx by way of the NOx storage reduction-type catalyst.

Patent Document 1: Japanese Unexamined Patent Application, Publication No. 2009-293585

According to the above such exhaust purification system of Patent Document 1, it is possible to purify the three-way components in the exhaust gas both during lean operation controlling the equivalence ratio of the air-fuel mixture to lean and during stoichiometric operation controlling the equivalence ratio of the air-fuel mixture to stoichiometric. However, with the system using the three-way purification function intermittently in this way, performing equivalence ratio control precisely becomes important particularly during stoichiometric operation, as explained below. However, this point is not sufficiently considered in Patent Document 1.

First, when supposing not possible to precisely control the equivalence ratio of the air-fuel mixture to stoichiometric, a three-way catalyst containing a sufficient amount of OSC material and including a sufficiently wide purification window must be used in the catalyst for exhibiting the three-way purification function. In addition, when the content of OSC material increases in this way, not only does the cost increase proportionally, but also the adverse effect also arises in that the oxidation performance for HC or CO declining under exhaust gas of lean equivalence ratio. Furthermore, when increasing the content of OSC material, since the oxygen stored on the OSC material during lean operation also comes to be abundant, the time required until the OSC material finishes releasing oxygen when changing the pre-catalyst air-fuel ratio from lean to stoichiometric, i.e. time required until the air-fuel ratio environment on the catalyst switches from lean to stoichiometric, lengthens, and thus the adverse effect also arises in that the required time until the NOx purification rate rises lengthens. It should be noted that, although it has been considered to richen the air-fuel ratio in order to shorten the oxygen release time of the OSC material, the emission amount of HC and CO to downstream of the catalyst increases in this case.

In addition, for a DeNOx catalyst such as a general NOx storage reduction-type catalyst or selective reduction catalyst, the NOx purification performance declines during high-load operation such that the exhaust gas volume increases and the exhaust gas temperature rises. For this reason, it has been considered to perform stoichiometric operation also during high-load operation, and use the three-way purification function of the three-way catalyst under exhaust gas of stoichiometric equivalence ratio to compensate for the decline in purification performance of the DeNOx catalyst. However, during such high-load operation, since the purification window of three-way catalyst also narrows, high-precision equivalence ratio control is still necessary in order to exhibit sufficient three-way purification performance.

The present invention has been made by considering the above such points, and has an object of providing a control device for an internal combustion engine capable of high-precision equivalence ratio control.

DISCLOSURE OF THE INVENTION

A control device (e.g., the ECU 3, 3A described later) of an internal combustion engine (e.g., the engine 1 described later) according to a first aspect of the present invention to control an equivalence ratio of air-fuel mixture of the engine based on output of an exhaust gas sensor (e.g., the LAF sensor 21 described later) which detects an equivalence ratio of exhaust gas of the engine, includes: a first identifying unit (e.g., the feedback identifier 35 described later) which performs modeling on a system from a parameter related to a fuel injection amount of the engine to a parameter related to an output of the exhaust gas sensor as a first model (e.g., the injection amount-sensor output model described later) with a model formula including first model parameters (A, B) and a second model parameter (C) and which sequentially identifies values of the first model parameters (A, B); a second identifying unit (e.g., the LAF delay compensation identifier 35 described later) which performs modeling on a system from a value of a parameter calculated using a model formula of the first model to the output of the exhaust gas sensor as a second model (e.g., the port equivalence ratio-sensor output model described later) with a model formula including the second model parameter (C) and which sequentially identifies a value of the second model parameter (C) based on the output ($\varphi$laf) of the exhaust gas sensor; and a controller (e.g., the stoichiometric operation mode controller 37 described later) which determines a value of a parameter (Gfuel) for controlling the equivalence ratio of air-fuel mixture of the engine based on the first model parameters (A, B). Herein, the parameters related to the fuel injection amount and the output of the LAF sensor, in addition to the fuel injection amount and output of the LAF sensor themselves, may include physical quantities obtained through predetermined arithmetic expressions from the fuel injection amount and output of the LAF sensor.

According to a second aspect, in this case, it is preferable for the second identifying unit to update the value of the second model parameter (C) at least during variation of the output ($\varphi$laf) of the exhaust gas sensor.

According to a third aspect, in this case, it is preferable for the first identifying unit to update the values of the first model parameters (A, B) while the engine is under a specific first operating condition; and the second identifying unit to update the value of the second model parameter (C) while the engine is under a second operating condition of which range is wider than that of the first operating condition.

According to a fourth aspect, in this case, it is preferable for the control device to further include an abnormality determining unit (e.g., the means related to execution of Step S40 described later) which determines abnormality of the exhaust gas sensor owing to comparison between the value of the second model parameter (C) identified by the second identifying unit and a predetermined threshold value (C_aged) for abnormality determination, the second model parameter (C) being a parameter regarding a detection delay characteristic of the exhaust gas sensor.

According a fifth aspect, in this case, it is preferable for the second model parameter to be a parameter related to the detection delay characteristic of the exhaust gas sensor, and the first identifying unit to include a sensor output estimation operation unit that calculates an estimated value of the output of the exhaust gas sensor with the fuel injection amount as an input, according to a model formula of a first model including the first model parameters and the second model parameter; and an identification operation unit that identifies values of the first model parameters so as to minimize error between the estimated value and the output of the exhaust gas sensor.

According to a sixth aspect, in this case, it is preferable for the second model parameter to be a parameter related to the detection delay characteristic of the exhaust gas sensor, and the first identifying unit to include: a delay operation unit that performs delay calculation characterized by the second model parameter on the fuel injection amount; a sensor output estimation operation unit that calculates an estimated value of the output of the exhaust gas sensor by performing a predetermined operation characterized by the first model parameter on the output of the delay operation unit; and an identification operation unit that identifies values of the first model parameters so as to minimize error between the estimated value and the output of the exhaust gas sensor.

Effects of the Invention

According to the first aspect, the system from the fuel injection amount to the output of the exhaust gas sensor is modeled as the first model. In addition, the system from the value of the parameter obtained from this first model until the output of the exhaust gas sensor, i.e. model encompassed in the above first model, is modeled as the second model. The first identifying unit identifies, among the first and second model parameters included in the first model, the values of the first model parameters. The second identifying unit identifies the value of the second model parameter included in the above first model based on the output of the exhaust gas sensor. Then, the controller determines the value of the parameter for controlling the equivalence ratio of the air-fuel mixture of the engine using the first model parameters. In this way, the present invention can control the equivalence ratio with high precision, without causing overshoot or oscillatory behavior to occur in the output of the exhaust gas sensor, by way of controlling the equivalence ratio of the air-fuel mixture using the model. In addition, there is error (modeling error) between the actual system and the first model due to the influence of individual variation and ageing of various devices constituting the actual system. With the present invention, this modeling error can be reflected in the values of the first and second model parameters by the first and second identifying units. Therefore, according to the present invention, it is possible to control the equivalence ratio with high precision while making the influence due to individual variation, etc. of various devices a minimum.

Herein, the advantages of identifying the values of two types of model parameters (first and second model parameters) included in one model (first model) by two identifying units (first and second identifying units) will be explained. The above-mentioned modeling error, in addition to steady-state error caused by individual variation, etc. of various devices, is divided into dynamic error that can arise in the transitional characteristic of the output of the exhaust gas sensor, for example. These two types of error having different occurrence timings. Therefore, when simultaneously identifying the values of the above-mentioned two types of model parameters using only one identifying unit, since two types of errors cannot be isolated, as a result, the identification precision of the model parameter declines. By providing two identifying units, for example, the present invention can identify the values of the first model parameters so as to compensate for steady-state error with the first identifying unit, and identify the value of the second model parameter so as to compensate for dynamic error with the second identifying unit. In other words, it is possible to assign identifying units to every characteristic of error, and respectively identify the value of model parameters at appropriate timings with high precision. Therefore, according to the present invention, it is possible to control the equivalence ratio with high precision.

According to the second aspect of the present invention, it is possible to improve the identification precision of the second model parameter, by updating the value of the second model parameter while the output of the exhaust gas sensor is varying by way of the second identifying unit. It is thereby possible to also improve the identification precision of the first model parameters by way of the first identifying unit. Therefore, it is possible to control the equivalence ratio with high precision.

According to the third aspect, in the aforementioned way, the first identifying unit identifies, among the first and second model parameters included in the first model, the value of the first model parameters, and the second identifying unit identifies the value of the second model parameter. In other words, in order for the values of the first model parameters identified by the first identifying unit to be accurate, it is necessary for the value of the second model parameter to be accurately identified by the second identifying unit. Therefore, by the second identifying unit updating the value of the second model parameter under broader operating conditions than the first identifying unit, as a result, the identification precision of the first model parameters by way of the first identifying unit can also be improved.

According to the fourth aspect of the present invention, since the two types of model parameters are identified by two identifying units in the aforementioned way, it is possible to precisely identifying these model parameters. Therefore, by determining abnormality in the exhaust gas sensor using the second model parameter that has been precisely identified in this way, it is possible to precisely detect deterioration in the exhaust gas sensor.

According to the fifth aspect of the present invention, the first identifying unit calculates an estimated value for the output of the exhaust gas sensor from the fuel injection amount using the model formula using the second model parameter identified by the second identifying unit and the first model parameters, and simultaneously identifies the values of the first model parameters so that the error between this estimated value and the actual output of the sensor reaches a minimum. In other words, the first identifying unit can precisely identify the value of the first model parameter, by repeatedly performing the operations of the sensor output estimation operation unit and the identification operation unit.

According to the sixth aspect of the present invention, upon calculating the estimated value for the output of the exhaust gas sensor from the fuel injection amount, the first identifying unit calculates the estimated value for the output of the exhaust gas sensor by first performing a delay operation characterized by the second model parameter with the fuel injection amount as an input, and then performing a predetermined operation characterized by the first model parameters on the value obtained by way of this delay operation. Then, the value of the first model parameters are identified so that the error between this estimated value and the actual sensor output reaches a minimum. In other words, according to the present invention, it is possible to exclude the delay operation including the second model parameter, from the operation loop of the first model parameters consisting of the sensor output estimation operation unit and the identification operation unit. For this reason, when comparing with the above fifth aspect of the invention, since it is possible to improve the identification rate of the identification operation unit, the operations of the sensor output estimation operation unit and identification operation unit can be repeatedly performed in a short time, as well as being able to accurately identify the values of the first model parameters in a short time.

EXPLANATION OF REFERENCE NUMERALS

Figure 1:
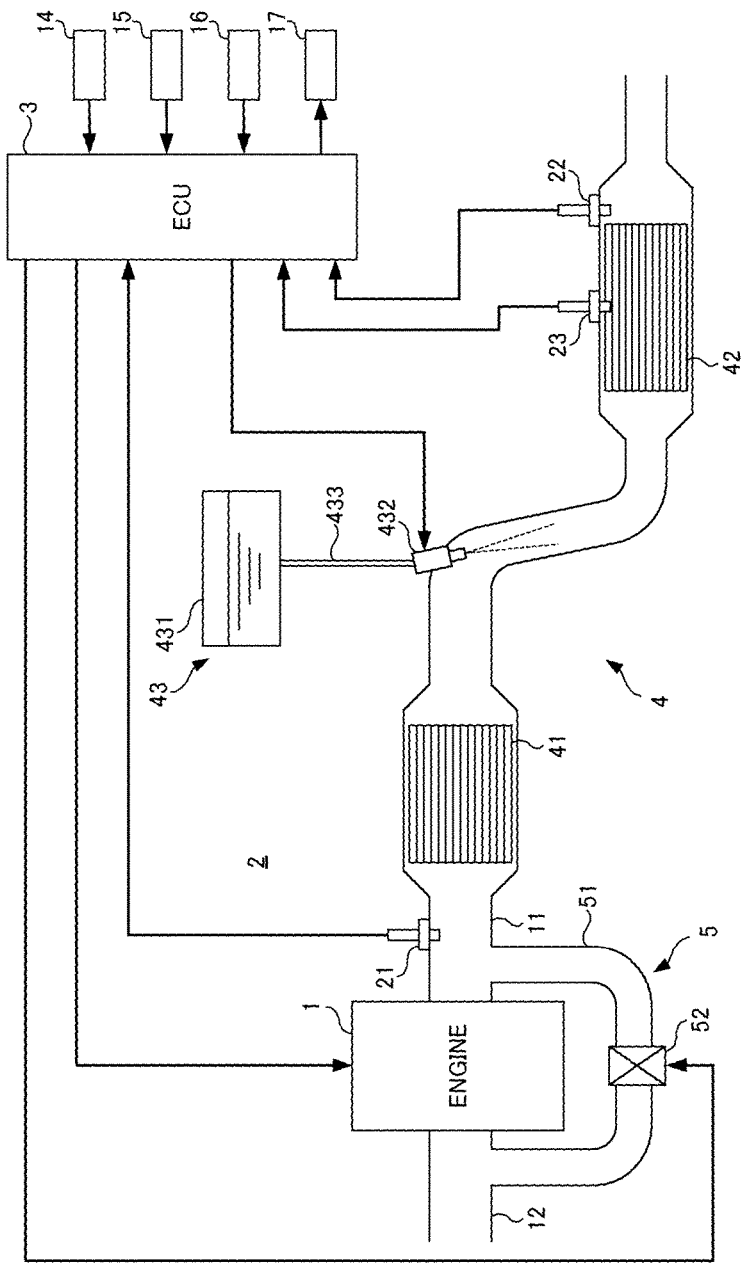
FIG. 1 is a schematic diagram showing the configuration of an engine and an exhaust purification system thereof according to one embodiment of the present invention.

1 engine (internal combustion engine)
11 exhaust passage
2 exhaust purification system
21 LAF sensor (exhaust gas sensor)
3 ECU (control device)
31 fuel injection amount calculating unit
32 lean operation mode controller
34 adaptive feedback controller
35 LAF delay compensation identifier (second identifier)
36 feedback identifier (first identifier)
37 stoichiometric operation mode controller (controller)
4 catalytic purification device

PREFERRED MODE FOR CARRYING OUT THE INVENTION

Hereinafter, an embodiment of the present invention will be explained by referencing the drawings.

FIG. 1 is a schematic view showing the configuration of an internal combustion engine (hereinafter referred to as "engine") 1 and an exhaust purification system 2 equipped with a control device thereof. The engine 1 is one based on so-called lean combustion that sets the equivalence ratio of the air-fuel mixture to leaner than stoichiometric, and more specifically, is a diesel engine, lean-burn gasoline engine, or the like. In the present embodiment, the engine 1 will be explained as a diesel engine.

The exhaust purification system 2 is configured to include a catalytic purification device 4 provided in an exhaust passage 11 of the engine 1, an EGR device 5 that recirculates a portion of the exhaust flowing through the exhaust passage 11 into an intake passage 12, and an electronic control unit (hereinafter referred to as "ECU") 3 as a control device that controls the engine 1, catalytic purification device 4 and EGR device 5.

Fuel injection valves (not illustrated) that inject fuel to the respective cylinders are provided to the engine 1. An actuator that drives this fuel injection valve is electromagnetically connected to the ECU 3. The ECU 3 determines a fuel injection amount, injection timing, etc. of the fuel injection valves according to a sequence described in detail later, and controls the fuel injection valves so that a determined fuel injection situation is realized.

The catalytic purification device 4 includes a first catalytic converter 41 provided on an upstream side in the exhaust passage 11, a second catalytic converter 42 provided on a downstream side from this first catalytic converter 41, and a reducing agent supply device 43 that supplies reducing agent to the second catalytic converter 42. The first catalytic converter 41 is provided immediately after the engine 1 in the exhaust passage 11. Therefore, the first catalytic converter is referred to as direct-downstream catalytic converter hereinafter. In addition, the second catalytic converter 42 is provided at a position separated from the engine 1, more specifically, under the floor in a state mounting the exhaust purification system 2 to a vehicle, which is not illustrated. Therefore, the second catalytic converter is referred to as an under-floor catalytic converter hereinafter. A catalyst for promoting reactions to purify components such as HC, CO and NOx contained in the exhaust gas are respectively provided to the direct-downstream catalytic converter 41 and the under-floor catalytic converter 42.

A catalyst at least having a three-way purification function is used in the direct-downstream catalyst equipped to the direct-downstream catalytic converter 41. Three-way purification function refers to a function of a three-way purification reaction, i.e. reaction in which the oxidations of HC and CO and reduction of NOx are carried out simultaneously, progresses under exhaust gas of stoichiometric equivalence ratio. As a catalyst having such a three-way purification function, an oxidation catalyst, three-way catalyst and NOx storage reduction-type catalyst can be exemplified. Any one of these three catalysts is preferably used in the direct-downstream catalyst.

The oxidation catalyst (DOC) purifies HC, CO and NOx according the above-mentioned three-way purification reaction under exhaust gas with a stoichiometric equivalence ratio, and purifies by oxidizing HC and CO under exhaust gas with a lean equivalence ratio.

The three-way catalyst (TWC) corresponds to a catalyst produced by adding an oxygen storage material to this oxidation catalyst. The three-way catalyst and oxidation catalyst have fundamentally the same purification function. However, the three-way catalyst excels in the aspect of the three-way purification window being wider compared to the oxidation catalyst.

The NOx storage reduction-type catalyst (NSC) purifies HC, CO and NOx by way of a three-way purification reaction similarly to the above-mentioned oxidation catalyst under exhaust gas with a stoichiometric equivalence ratio, and purifies by storing NOx under exhaust gas with a lean equivalence ratio. It should be noted that the stored NOx is released by setting the equivalence ratio of exhaust gas to stoichiometric or the richer side of stoichiometric, and is reduced with HC contained in the exhaust gas serving as a reducing agent.

In the under-floor catalyst equipped to the under-floor catalytic converter 42, a catalyst is used on which the NOx purification reaction advances under exhaust gas with a lean equivalence ratio in which oxygen is contained in abundance. As a catalyst provided with such NOx purification performance, in addition to the aforementioned NOx storage reduction-type catalyst, a selective reduction catalyst can be exemplified.

The selective reduction catalyst (SCR) reduces NOx under the presence of a reducing agent supplied from outside such as $NH_3$ or HC, or under the presence of HC present in exhaust gas. It should be noted that the present embodiment explains an example in which the under-floor catalyst is established as a selective reduction catalyst. The modifications in the case of establishing the under-floor catalyst as a NOx storage reduction-type catalyst will be explained later.

The reducing agent supply device 43 includes a urea water tank 431 and urea water injector 432. The urea water tank 431 stores urea water, which is a precursor of the reducing agent ($NH_3$) for the under-floor catalytic converter 42. The urea water tank 431 is connected to the urea water injector 432 via a urea water supply pipe 433 and a urea water pump that is not illustrated. The urea water injector 432 opens and closes when driven by an actuator (not illustrated) to inject urea water supplied from the urea water tank 431 into the exhaust passage 11 on an upstream side of the under-floor catalytic converter 42. The urea water injected from the injector 432 is hydrolyzed to $NH_3$ in the exhaust gas or under-floor catalytic converter 42, and is consumed in NOx reduction. The actuator of the urea water injector 432 is electromagnetically connected to the ECU 3. The ECU 3 calculates the required urea water injection amount depending on the output of a NOx sensor 22 described later, as well as controlling the urea water injector 432 so that urea water of an amount in accordance with this injection amount is injected. It should be noted that a detailed explanation of urea water injection control by the ECU 3 is omitted.

The EGR device 5 is configured to include an EGR channel 51, EGR control valve 52, EGR cooler that is not illustrated, etc. The EGR channel 51 connects an upstream side from the direct-downstream catalytic converter 41 in the exhaust passage 11 with the intake passage 12. The EGR control valve 52 is provided in the EGR channel 51, and controls the amount of exhaust gas recirculated into the cylinders of the engine 1 via this EGR channel 51 (hereinafter referred to as "EGR gas"). The actuator driving this EGR control valve 52 is electromagnetically connected to the ECU 3. The ECU 3 calculates an estimated value of an EGR gas amount (or EGR rate), as well as determining a target value of the EGR gas amount (or EGR rate) according to the sequence described in detail later, and controlling the EGR control valve so that this estimated value becomes the target value.

As sensors for detecting the states of the exhaust purification system 2 and engine 1, an LAF sensor 21, NOx sensor 22, catalyst temperature sensor 23, crank angle position sensor 14, accelerator aperture sensor 15, air flow sensor 16 and the like are connected to the ECU 3.

The LAF sensor 21 detects the equivalence ratio of exhaust gas downstream from the exhaust ports of the engine 1 and upstream from the under-floor catalytic converter 41, and sends a signal substantially proportional to the detected value to the ECU 3. The NOx sensor 22 detects the NOx concentration in exhaust gas on a downstream side from the under-floor catalytic converter 42, and sends a signal substantially proportional to the detected value to the ECU 3. The catalyst temperature sensor 23 detects the temperature of the under-floor catalytic converter 42, and sends a signal substantially proportional to the detected value to the ECU 3. The crank angle position sensor 14 detects a rotation angle of the crank shaft of the engine 1, as well as supplying pulses every predetermined crank angle to the ECU 3. In the ECU 3, the revolution speed NE of the engine 1 is calculated based on this pulse signal. The accelerator aperture sensor 15 detects a depression amount of the accelerator pedal, which is not illustrated, and sends a signal substantially proportional to the detection value to the ECU 3. In the ECU 3, a driver required drive force Tdrv is calculated based on the crank angle position sensor 14 and accelerator aperture sensor 15. The air flow sensor 16 detects a flow rate of fresh air flowing through the intake passage 12, i.e. fresh air amount supplied into the cylinders of the engine 1, and sends a signal substantially proportional to the detection value to the ECU 3.

In addition, a sensor abnormality warning lamp 17 for notifying the driver of an abnormality in the LAF sensor 21 is connected to the ECU 3. This sensor abnormality warning lamp 17 is provided to the instrument panel of the vehicle, for example, and illuminates in response to it being determined that the LAF sensor 21 is abnormal (refer to Step S41 in FIG. 18 described later).

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU in order to execute the equivalence ratio control described later, calculation results, and the like, and an output circuit that outputs control signals to the fuel injection valves of the engine 1, urea water injector 432, EGR control valve 52, and the like.

Next, the concept of equivalence ratio control of the present invention for effectively exhibiting the aforementioned such three-way purification function and NOx purification function will be explained by referencing FIGS. 2 to 5. A specific sequence of this equivalence ratio control will be explained in detail by referencing FIGS. 6 to 26.

Figure 2:
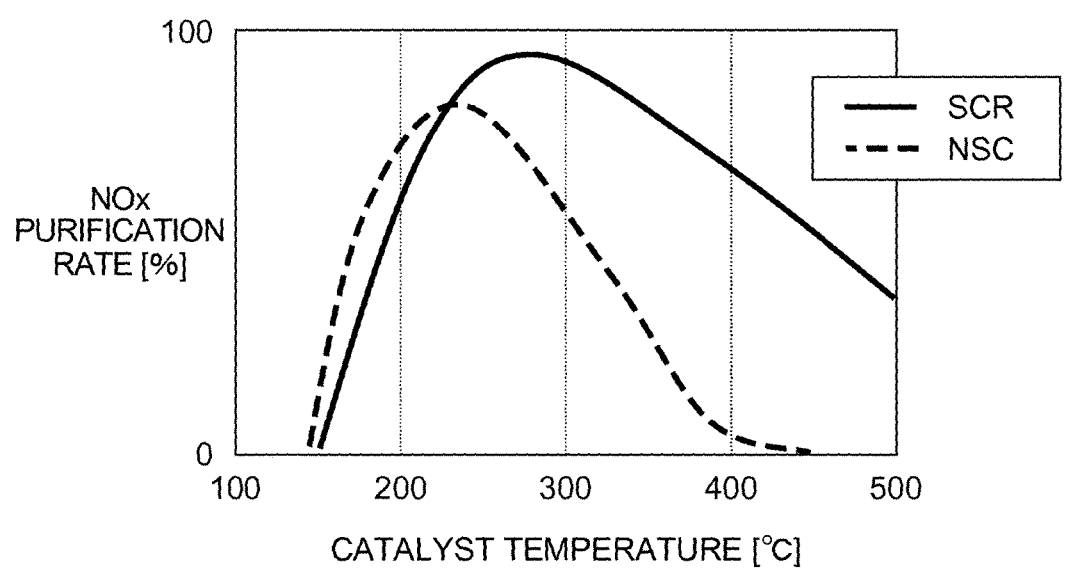
FIG. 2 is a graph showing the temperature characteristic of a NOx purification performance of an under-floor catalyst bearing NOx purification under exhaust gas of lean equivalence ratio.

FIG. 2 is a graph showing the temperature characteristics of the NOx purification performance of the under-floor catalyst bearing NOx purification under exhaust gas of a lean equivalence ratio. The horizontal axis is the catalyst temperature (° C.), and the vertical axis is the NOx purification rate (%) under exhaust gas of lean equivalence ratio. In addition, the solid line indicates a case of establishing the under-floor catalyst as a selective reduction catalyst (SCR catalyst), and the dotted line indicates a case of establishing the under-floor catalyst as a NOx storage reduction-type catalyst (NSC). As shown in this figure, these under-floor catalysts exhibit high NOx purification performance in the case of the equivalence ratio of the exhaust gas being lean and the catalyst temperature being in an appropriate temperature range. It should be noted that an upward-convex characteristic similar to FIG. 2 is exhibited even when the horizontal axis is established as the exhaust gas volume (exhaust gas amount per unit time).

For this reason, during high-load operation in which the exhaust gas temperature rises and the exhaust gas volume increases, the catalyst temperature and exhaust gas volume increase to exceed the appropriate ranges, and thus the NOx purification rate declines. Such a decline in the NOx purification rate during high-load driving is compensated for to some extent by increasing the volume of under-floor catalyst device, or increasing noble metal loading amount on the catalyst or the loading amount of reduction reaction material such as zeolite; however, the cost increases in proportion and the installation properties of a device deteriorate. The equivalence ratio control of the present invention compensates for the decline in NOx purification performance of the under-floor catalyst, by causing the three-way purification reaction on the direct-downstream catalyst to advance by setting the equivalence ratio of the air-fuel mixture from lean to stoichiometric during such high-load operation. Next, the concept of this equivalence ratio control will be explained by referencing FIGS. 3 to 5.

Figure 3:
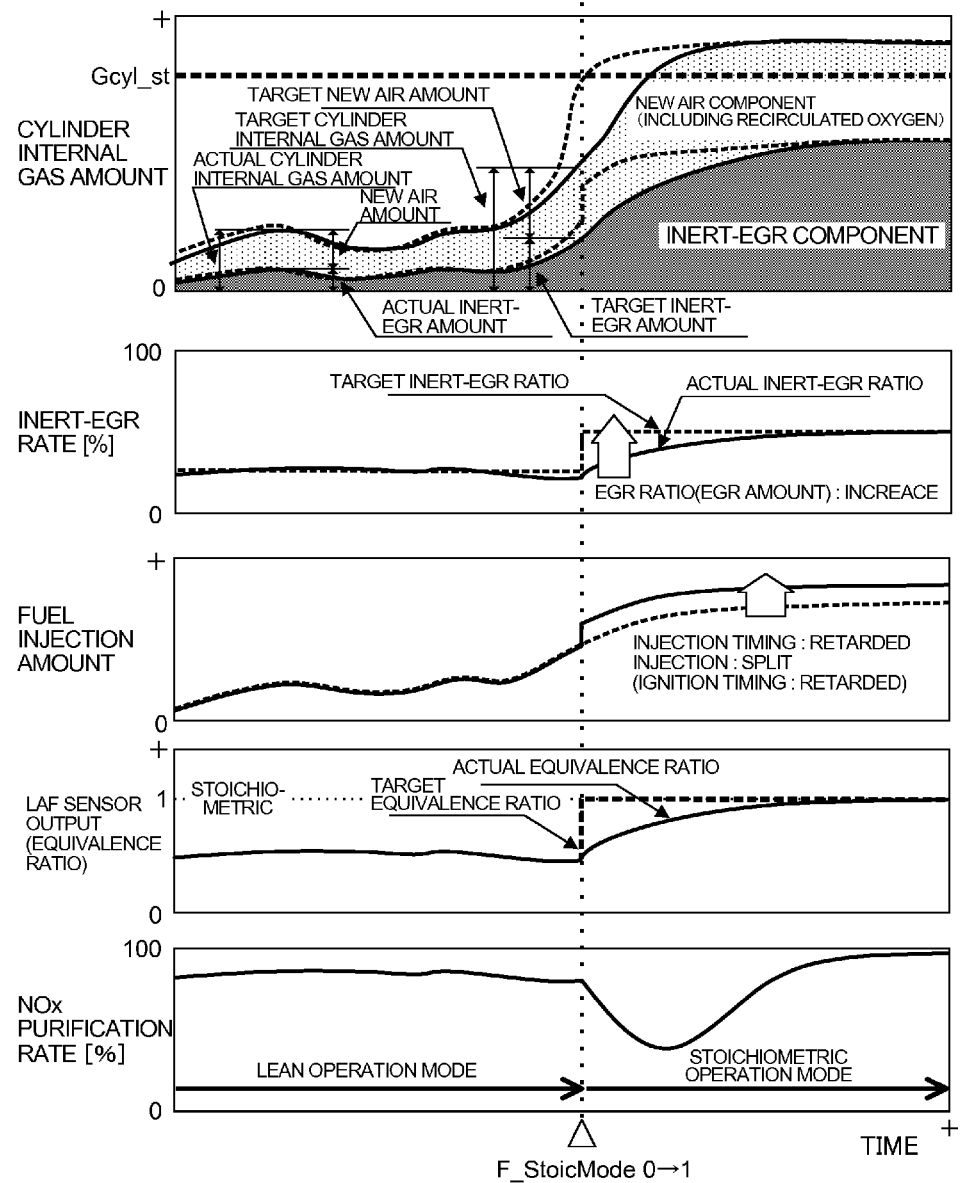
FIG. 3 is a first view illustrating the concept of equivalence ratio control of the present invention.

FIG. 3 is a first view illustrating the concept of equivalence ratio control of the present invention. FIG. 3 shows, in order from the top, a breakdown of gas introduced to the cylinder, Inert-EGR rate (%), fuel injection amount, LAF sensor output and NOx purification rate (%). It should be noted that Inert-EGR refers to an inert component excluding oxygen in the EGR gas recirculated into the cylinder view the EGR channel.

The gas introduced to the cylinder is divided into a new air component including oxygen in the EGR gas and the Inert-EGR component. At the topmost of FIG. 3, the two dotted lines indicate the target value of cylinder internal gas amount (target cylinder internal gas amount) and the target value of the Inert-EGR amount (target Inert-EGR amount), respectively. The value arrived at by deducting the target Inert-EGR amount from the target cylinder internal gas amount corresponds to the target value of the new air amount (target new air amount). In addition, at the topmost of FIG. 3, the two solid lines indicate the actual value of the cylinder internal gas amount (actual cylinder internal gas amount) and actual value of the Inert-EGR amount (actual Inert-EGR amount), respectively. The value arrived at by deducting the actual Inert-EGR amount from the actual cylinder internal gas amount corresponds to the actual value of the new air amount (actual new air amount). In addition, this actual cylinder internal gas amount and actual Inert-EGR amount are controlled so as to follow the respective target values.

As shown at the topmost of FIG. 3, the target cylinder internal gas amount is determined so as to increase in response to the driver required drive force. When the target cylinder internal gas amount increases, since the temperature of exhaust gas rises and the exhaust gas volume also increases, the NOx purification performance of the under-floor catalyst declines, as explained by referencing FIG. 2. Therefore, in the equivalence ratio control of the present invention, by setting a predetermined threshold Gcyl_st for the target cylinder internal gas amount, the engine operation mode is switched between a lean operation mode and a stoichiometric operation mode.

In the lean operation mode, the ECU decides the fuel injection amount, Inert-EGR rate, etc. by an algorithm established in advance so that the equivalence ratio of the air-fuel mixture is on the leaner side of stoichiometric, and actively uses the NOx purification function by the under-floor catalyst to maintain the NOx purification rate to be high.

In the stoichiometric operation mode, the ECU controls the fuel injection amount, Inert-EGR rate, etc. so that the equivalence ratio of the air-fuel mixture becomes stoichiometric, and actively uses the three-way purification function by the direct-downstream catalyst to compensate for the decline in the NOx purification performance by the under-floor catalyst. On this occasion, the ECU controls the equivalence ratio of the air-fuel mixture to stoichiometric; therefore, compared to a case of establishing with the same algorithm as during lean operation mode, it increases the Inert-EGR rate (or Inert-EGR amount), and increases the fuel injection amount. Herein, it is preferable for the fuel injection amount to increase by intentionally causing the engine combustion efficiency to decline. It should be noted that the engine combustion efficiency can be made to decline by retarding the fuel injection timing compared to during the lean operation mode, and splitting fuel injection, as described in detail later. In addition, in the case of the engine being a gasoline engine, it is possible to cause the engine combustion efficiency to decline by retarding the ignition timing.

Figure 4:
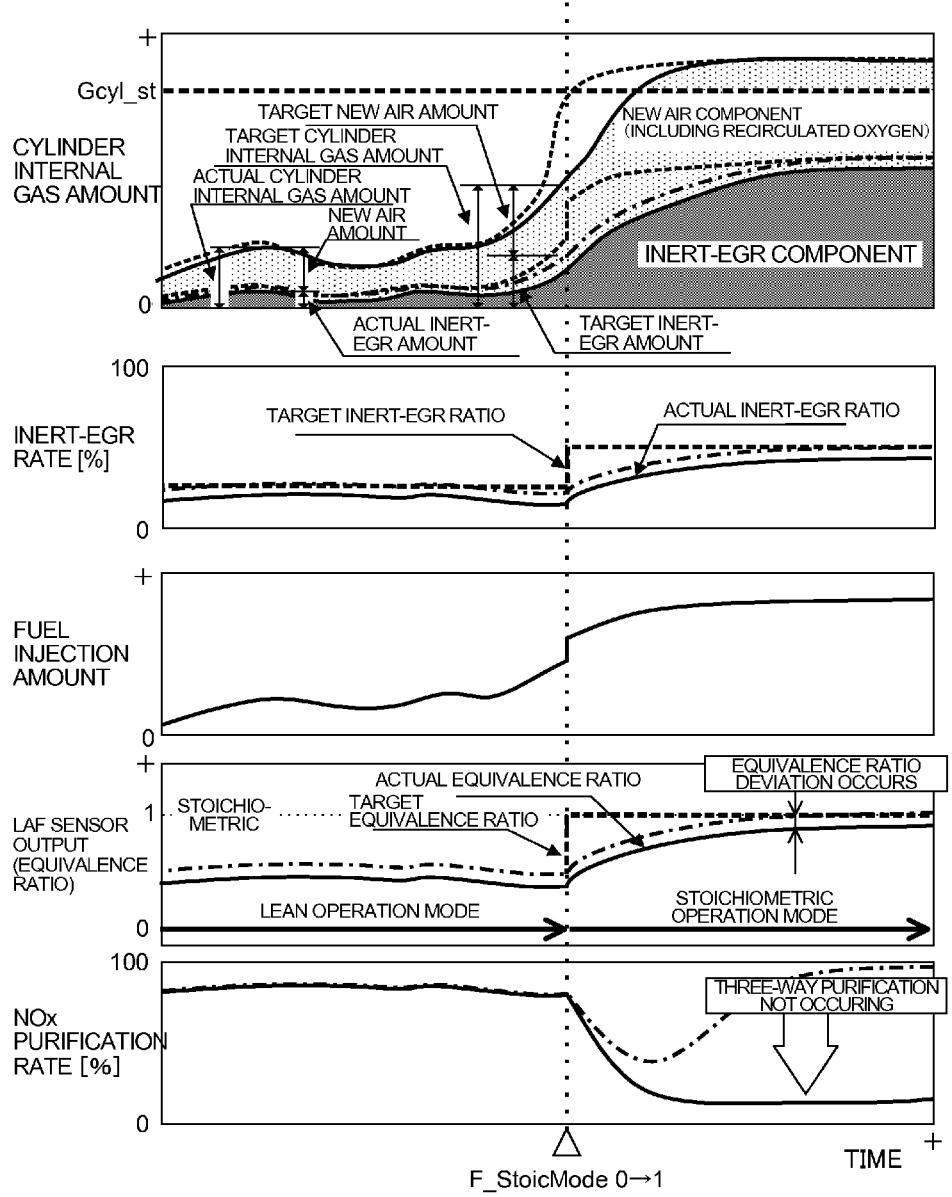
FIG. 4 is a second view illustrating the concept of equivalence ratio control of the present invention.

FIG. 4 is a second view illustrating the concept of the equivalence ratio control of the present invention.

As explained by referencing FIG. 3, in the stoichiometric operation mode, the equivalence ratio of exhaust gas is controlled to stoichiometric by combining the increase in Inert-EGR rate and the fuel injection amount. Herein, the Inert-EGR rate can be made to increase by adjusting the aperture of the EGR control valve, for example. However, the flow rate characteristics of this EGR control valve varies according to the individual variation or ageing. For this reason, as shown in FIG. 4, steady-state deviation between the actual Inert-EGR rate and target Inert-EGR rate arises, a result of which steady-state deviation may arise between the output of the LAF sensor (actual equivalence ratio) and the target equivalence ratio (stoichiometric). When the output of the LAF sensor deviates from stoichiometric, since the three-way purification reaction will no longer advance on the direct-downstream catalyst, the NOx purification rate will more greatly decline than what had been targeted.

FIG. 4 exemplifies a case of individual variation or ageing occurring in the EGR control valve; however, steady-state deviation may further arise in the LAF sensor output similarly to the case of individual variation or ageing occurring in the flow rate characteristic of the injector injecting the fuel.

Figure 5:
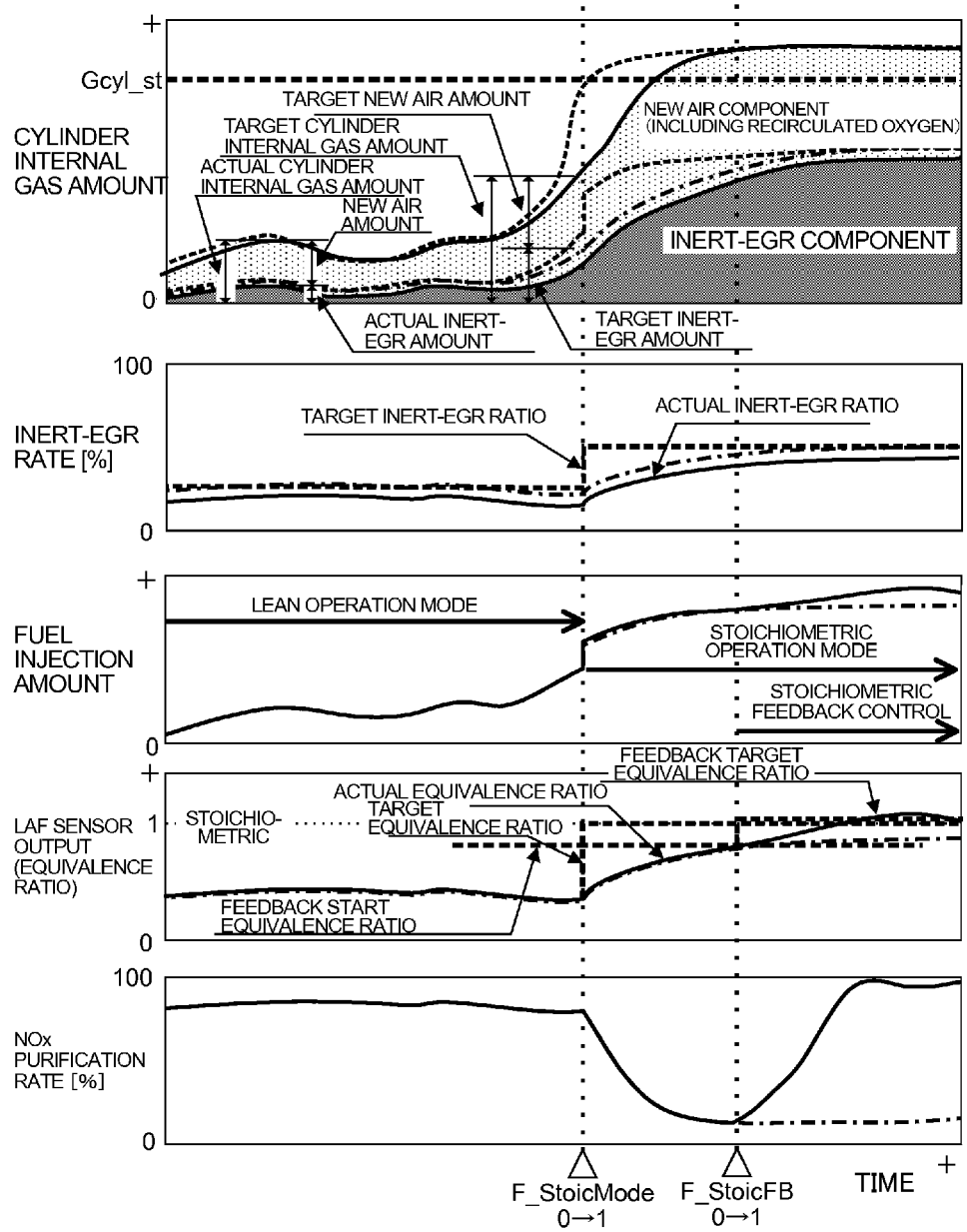
FIG. 5 is a third view illustrating the concept of equivalence ratio control of the present invention.

FIG. 5 is a third view illustrating the concept of equivalence ratio control of the present invention.

In order to eliminate steady-state deviation of the LAF sensor output during stoichiometric operation mode like that explained by referencing FIG. 4, it is necessary to perform feedback control using the LAF sensor output. FIG. 5 shows a case of starting stoichiometric feedback using the LAF sensor output at the time when a predetermined time has elapsed (F_StoicFB: 0→1) after the time switching from the lean operation mode to the stoichiometric operation mode (F_StoicMode: 0→1), and adjusting the fuel injection amount so that the output of the LAF sensor becomes stoichiometric. As shown in FIG. 5, in the stoichiometric operation mode, the equivalence ratio of the air-fuel mixture is precisely controlled also in a case of there being individual variation in the EGR control valve or injectors, by performing such stoichiometric feedback control, whereby the NOx purification rate can be raised.

As exemplified in FIG. 5, immediately after switching from the lean operation mode to the stoichiometric operation mode, the output of the LAF sensor is sufficiently smaller than stoichiometric. In addition, in order to control the equivalence ratio of the air-fuel mixture from this state to stoichiometric, it is necessary for the fuel injection amount to increase. For this reason, when starting the aforementioned stoichiometric feedback control immediately after switching from the lean operation mode to the stoichiometric operation mode, the fuel injection amount suddenly increases, and an unintended change in the engine torque may occur. For this reason, the stoichiometric feedback control starts, after the start of the stoichiometric operation mode, in response to the output of the LAF sensor surpassing the feedback start equivalence ratio set to a value somewhat smaller than stoichiometric. By starting the stoichiometric feedback operation mode after the output of the LAF sensor approaches stoichiometric to a certain extent in this way, it is made so that the fuel injection amount does not suddenly increase to suppress an unintended torque change.

It should be noted that, in FIGS. 3 to 5, although a case of switching to stoichiometric operation mode during the lean operation mode is explained, the NOx purification performance also declines in the case of the under-floor catalyst lowering to deviate from the optimum temperature range, as explained by referencing FIG. 2. For this reason, in the equivalence ratio control of the present invention, the operation mode of the engine is set to the stoichiometric operation mode from immediately after engine startup until the under-floor catalyst reaches the activation temperature, to employ the three-way purification function of the under-floor catalyst. The direct-downstream catalyst reaches activation more quickly than the under-floor catalyst due to being provided at a position closer to the engine than the under-floor catalyst. Therefore, by setting the operation mode of the engine immediately after startup to the stoichiometric operation mode, it is possible to raise the NOx purification rate from immediately after startup.

Figure 6:
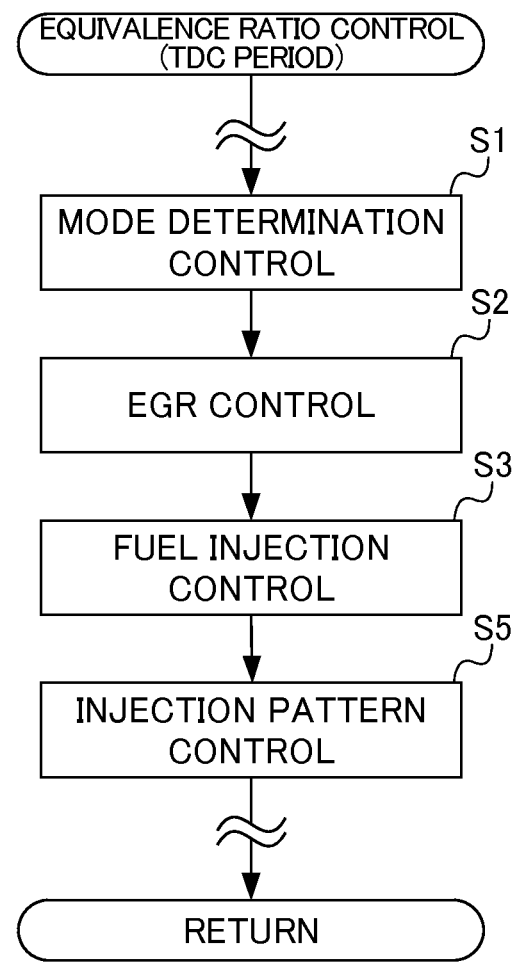
FIG. 6 is a view showing a part of a main flowchart showing the sequence of equivalence ratio control.

FIG. 6 is a drawing showing a part of a main flowchart showing the sequence of equivalence ratio control. This equivalence ratio control is executed in the ECU every predetermined control cycle (e.g., TDC cycle). As shown in FIG. 6, equivalence ratio control executed in the ECU includes mode determination control (Step S1), EGR control (Step S2), fuel injection control (Step S3), and injection pattern control (Step S5).

In the mode determination control of Step S1, the current appropriate operation mode is determined according to the state of the engine and exhaust purification system. The specific sequence of this mode determination control will be explained while referencing FIG. 7 later.

In the EGR control of Step S2, the target EGR amount and target EGR rate are determined according to the selected operation mode, etc. The specific sequence of this EGR control will be explained by referencing FIG. 8 later.

In the fuel injection control of Step S3, the fuel injection amount is determined according to the selected operation mode, target EGR amount, etc. The specific sequence of this fuel injection control will be explained by referencing FIGS. 9 to 18 later.

In the fuel pattern control of Step S5, the fuel injection amount decided in Step S3 is split according to the operation mode, etc. determined in Step S1. The specific sequence of this injection pattern control will be explained by referencing FIGS. 19 to 26 later.

Mode Determination Control

Figure 7:
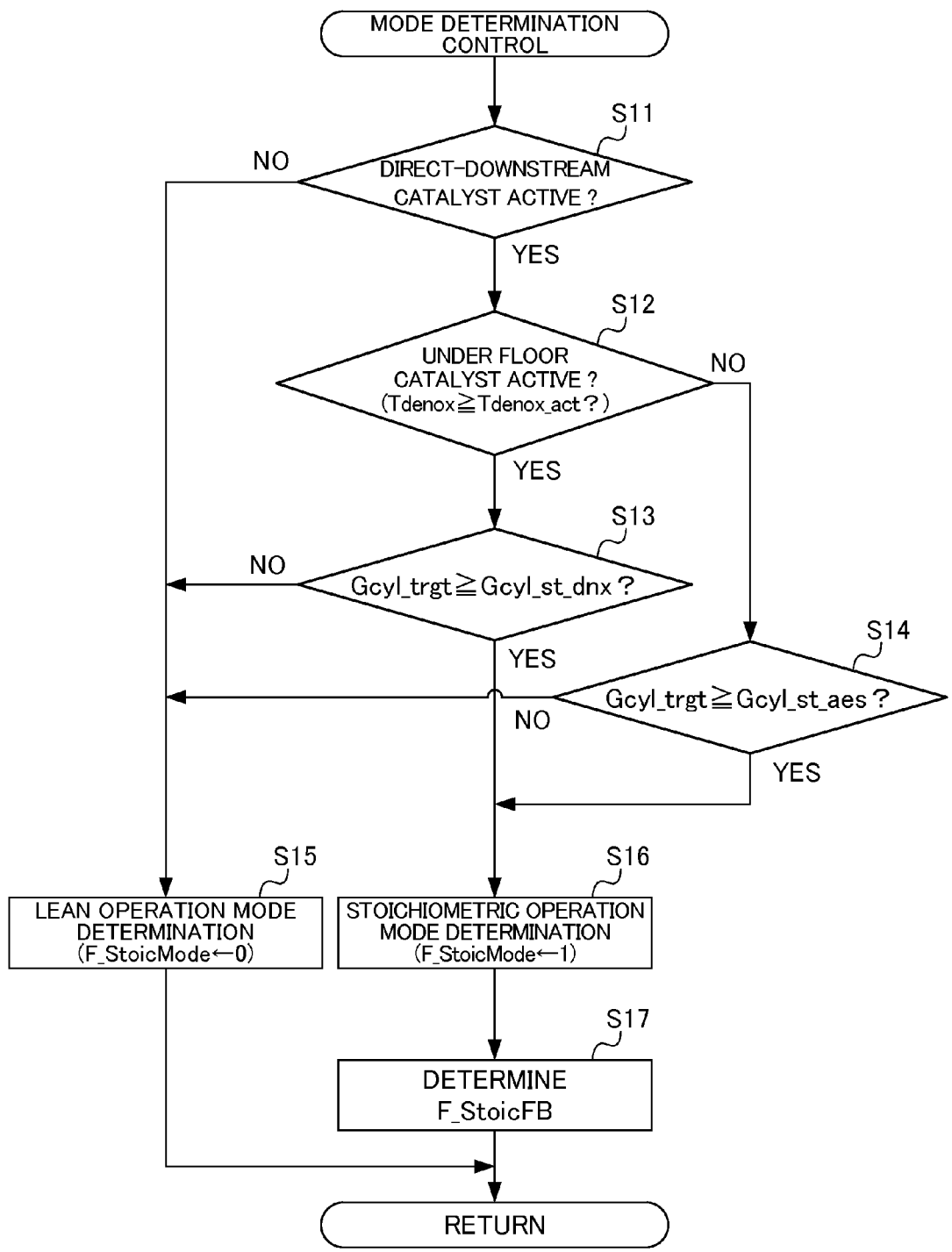
FIG. 7 is a flowchart showing a sequence of mode determination control.

FIG. 7 is a flowchart showing the sequence of mode determination control. In this mode determination control, the ECU sets the values of a stoichiometric purification mode flag F_StoicMode and stoichiometric feedback flag F_StoicFB. The stoichiometric purification mode flag F_StoicMode is a flag indicating that the current operation mode is the stoichiometric operation mode. The stoichiometric feedback flag F_StoicFB is a flag indicating the matter of being a state suited to the execution of stoichiometric feedback control.

In Step S11, the ECU determines whether the direct-downstream catalyst has reached activation. In the case of the determination in Step S11 being YES, the processing advances to Step S12.

In Step S12, the ECU determines whether the under-floor catalyst has reached activation, i.e. whether the under-floor catalyst temperature Tdenox(k) is at least a threshold Tdenox_act set in order to determine activation. It should be noted that this under-floor catalyst temperature Tdenox(k) is calculated based on the output of the catalyst temperature sensor. In the case of this determination being YES, the processing advances to Step S13, and in the case of being NO, the processing advances to Step S14.

In Step S13, the ECU determines that the target cylinder internal gas amount Gcyl_trgt(k) is at least a predetermined stoichiometric operation threshold Gcyl_st_dnx after under-floor catalyst activation.

In Step S14, the ECU determines whether the target cylinder internal gas amount Gcyl_trgt(k) is at least a predetermined stoichiometric operation threshold Gcyl_st_aes before under-floor catalyst activation.

Herein, the target cylinder internal gas amount Gcyl_trgt(k) is established every predetermined control cycle by searching a predetermined map according to the driver required drive force by way of processing that is not illustrated. In addition, the stoichiometric operation threshold Gcyl_st_dnx after under-floor catalyst activation is set to at least the stoichiometric operation threshold Gcyl_st_aes before under-floor catalyst activation (Gcyl_st_dnx≥Gcyl_st_aes).

It should be noted that, in Steps S13 and S14, although determined with the cylinder internal gas amount as an argument, it is possible to perform substantially equivalent determination even with physical amounts such as engine torque, engine output and exhaust gas volume as arguments.

In the above-mentioned determinations of Steps S11 to S14, in the case of being before the direct-downstream catalyst reaches activation (case of determination in Step S11 being NO), being prior to the under-floor catalyst reaches activation and the target gas amount Gcyl_trgt(k) being lower than the threshold Gcyl_st_aes (case of determination in Step S14 being NO), and a case of being after the under-floor catalyst reached activation and the target gas amount Gcyl_trgt(k) being less than the threshold Gcyl_st_dnx (case of determination in Step S13 being NO), the processing advances to Step S15. In Step S15, the ECU determines the current appropriate operation mode as being the lean operation mode, sets the stoichiometric purification mode flag F_StoicMode to 0, and ends the processing of FIG. 7 (refer to formula (1) below).

$$F\_StoicMode(k) = \begin{cases} 1 & (Gcyl\_trgt(k) \geq Gcyl\_st\_dnx \,\&\, Tdenox(k) \geq Tdenox\_act) \\ 0 & (Gcyl\_trgt(k) < Gcyl\_st\_dnx \,\&\, Tdenox(k) \geq Tdenox\_act) \\ 1 & (Gcyl\_trgt(k) \geq Gcyl\_st\_aes \,\&\, Tdenox(k) < Tdenox\_act) \\ 0 & (Gcyl\_trgt(k) < Gcyl\_st\_aes \,\&\, Tdenox(k) < Tdenox\_act) \end{cases} \quad (1)$$

In the above-mentioned determinations of Steps S11 to S14, in the case of being before the under-floor catalyst reaches activation and the target gas amount Gcyl_trgt(k) being at least the threshold Gcyl_st_aes (case of determination in Step S14 being YES), and a case of being after the under-floor catalyst reaches activation and the target gas amount Gycl_trgt(k) being at least the threshold Gcyl_st_dnx (case of determination in Step S13 being NO), the processing advances to Step S16. In Step S16, the ECU determines that the current appropriate operation mode is the stoichiometric operation mode, sets the stoichiometric purification mode flag F_StoicMode to 1, and advances to Step S17 (refer to formula (1) above).

In Step S17, the ECU sets the stoichiometric feedback flag F_StoicFB in accordance with formula (2) below, and ends the processing of FIG. 7. More specifically, the ECU switches the flag F_StoicFB from 0 to 1 in the case of the LAF sensor output φlaf exceeding a feedback start threshold φfb set to a value somewhat smaller than 1 (stoichiometric equivalence ratio) from a prior control time to a current control time, and resets the flag F_StoicFB from 1 to 0 in the case of the stoichiometric purification flag F_StoicMode having switched from 1 to 0 from the previous control time to the current control time. In other cases, the flag F_StoicFB is maintained in the previous state. By updating the value of the stoichiometric feedback flag F_StoicFB in the above way, the stoichiometric feedback control by the adaptive stoichiometric controller described later waits, after the operation mode of the engine switches from the lean operation mode to stoichiometric operation mode, for the LAF sensor output φlaf to surpass the feedback start threshold φfb, and then can cause to start.

$$F\_StoicFB(k) = \begin{cases} 1 & (\varphi laf(k) \geq \varphi fb \,\&\, \varphi laf(k-1) < \\ & \varphi fb \,\&\, F\_StoicMode(k) = 1) \\ 0 & (F\_StoicMode(k) = 0 \,\&\, F\_StoicMode(k-1) = 1) \\ F\_StoicFB(k-1) & \text{(other cases)} \end{cases} \quad (2)$$

EGR Control

Figure 8:
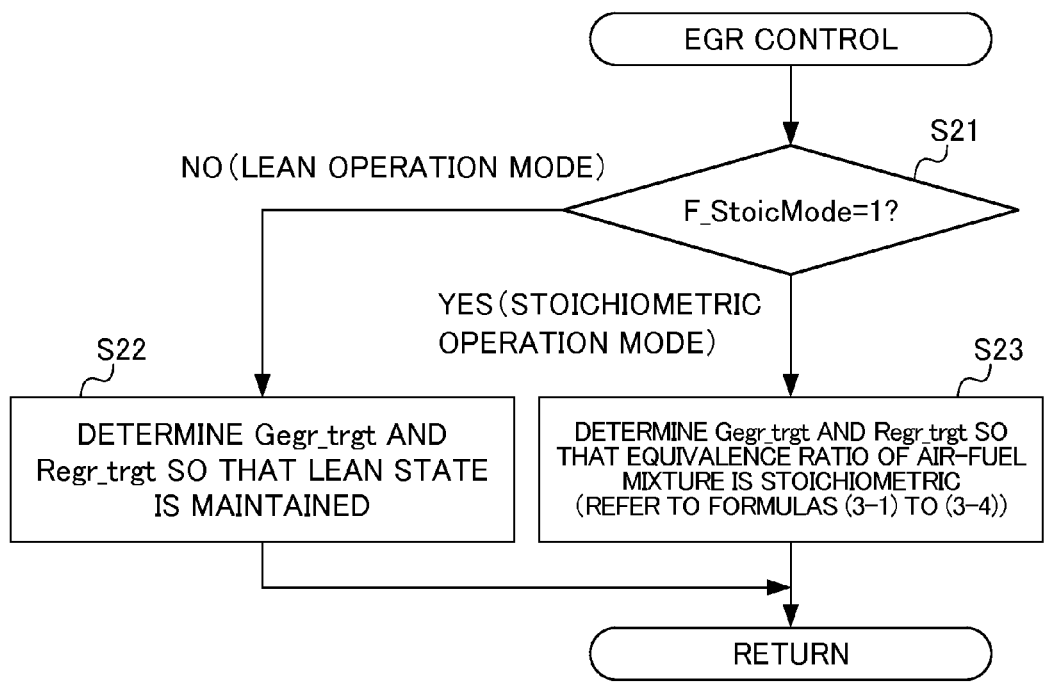
FIG. 8 is a flowchart showing a sequence of EGR control.

FIG. 8 is a flowchart showing the sequence of EGR control. In this EGR control, the ECU determines the target value of the EGR gas amount (target EGR amount) Gegr_trgt and the target value of the EGR rate (target EGR rate) Regr_trgt.

In Step S21, it is determined whether the current operation mode is the stoichiometric operation mode, i.e. whether the stoichiometric purification flag F_StoicMode is 1. In the case of the determination in Step S21 being NO, i.e. in the case of being during lean operation mode, the processing advances to Step S22, and the ECU determines the target EGR amount Gegr_trgt and target EGR rate Regr_trgt so that a state in which the equivalence ratio of the air-fuel mixture is lean is maintained, and so that the driver required drive force is realized. This target EGR amount Gegr_trgt and target EGR rate Regr_trgt are determined by searching a predetermined map for during lean operation mode.

In the case of the determination in Step S21 being YES, i.e. case of being during stoichiometric operation mode, the processing advances to Step S23 and the ECU determines the target EGR amount Gegr_trgt and target EGR rate Regr_trgt so that the equivalence ratio of air-fuel mixture becomes stoichiometric for the fuel injection amount determined so that the driver required drive force is realized, as explained later by referencing FIG. 9 and higher. More specifically, the ECU determines the target EGR amount Gegr_trgt and target EGR rate Regr_trgt following formulas (3-1) to (3-4) below.

$$Gfsh\_trgt(k) = \alpha st \cdot Gfuel(k) \quad (3\text{-}1)$$

$$Giegr\_trgt(k) = Gcyl\_trgt(k) - Gfsh\_trgt(k) \quad (3\text{-}2)$$

$$Gegr\_trgt(k) = \varphi laf(k-d) \cdot Giegr\_trgt(k) \quad (3\text{-}3)$$

$$Regr\_trgt(k) = Gegr\_trgt(k) / Gcyl\_trgt(k) \quad (3\text{-}4)$$

In formula (3-1) above, Gfsh_trgt(k) is the target cylinder internal new air amount. Gfuel(k) is the fuel injection amount determined in fuel injection control described later. The constant αst is a stoichiometric air-fuel ratio (e.g., 14.6). In other words, the target cylinder internal new air amount Gfsh_trgt is set to the amount necessary in order to cause the fuel of an amount such that the driver demanded drive power is realized to be stoichiometrically combusted.

In formula (3-2) above, Giegr_trgt(k) is the target Inert-EGR amount. Gcyl_trgt(k) is the target cylinder internal gas amount. In other words, a value arrived at by subtracting the target cylinder internal new air amount Gfsh_trgt(k) from the target cylinder internal gas amount Gcyl_trgt(k) serves as the target Inert-EGR amount Giegr_trgt(k).

In addition, the target EGR amount Gegr_trgt(k) is determined following formula (3-3) above, so that the target Inert-EGR amount Giegr_trgt(k) established in the above way is realized. More specifically, the target EGR amount Gegr_trgt(k) is determined as a value arrived at by multiplying the current target Inert-EGR amount Giegr_trgt(k) by a LAF sensor output φlaf(k-d) prior by an EGR recirculation time d, considering a time d required for EGR gas to be recirculated into the cylinder via the EGR channel (EGR recirculation time). In addition, the target EGR rate Regr_trgt(k) is calculated by dividing the target EGR amount Gegr_trgt(k) by the target cylinder internal gas amount Gcyl_trgt(k), as shown in formula (3-4) above.

Fuel Injection Control

Figure 9:
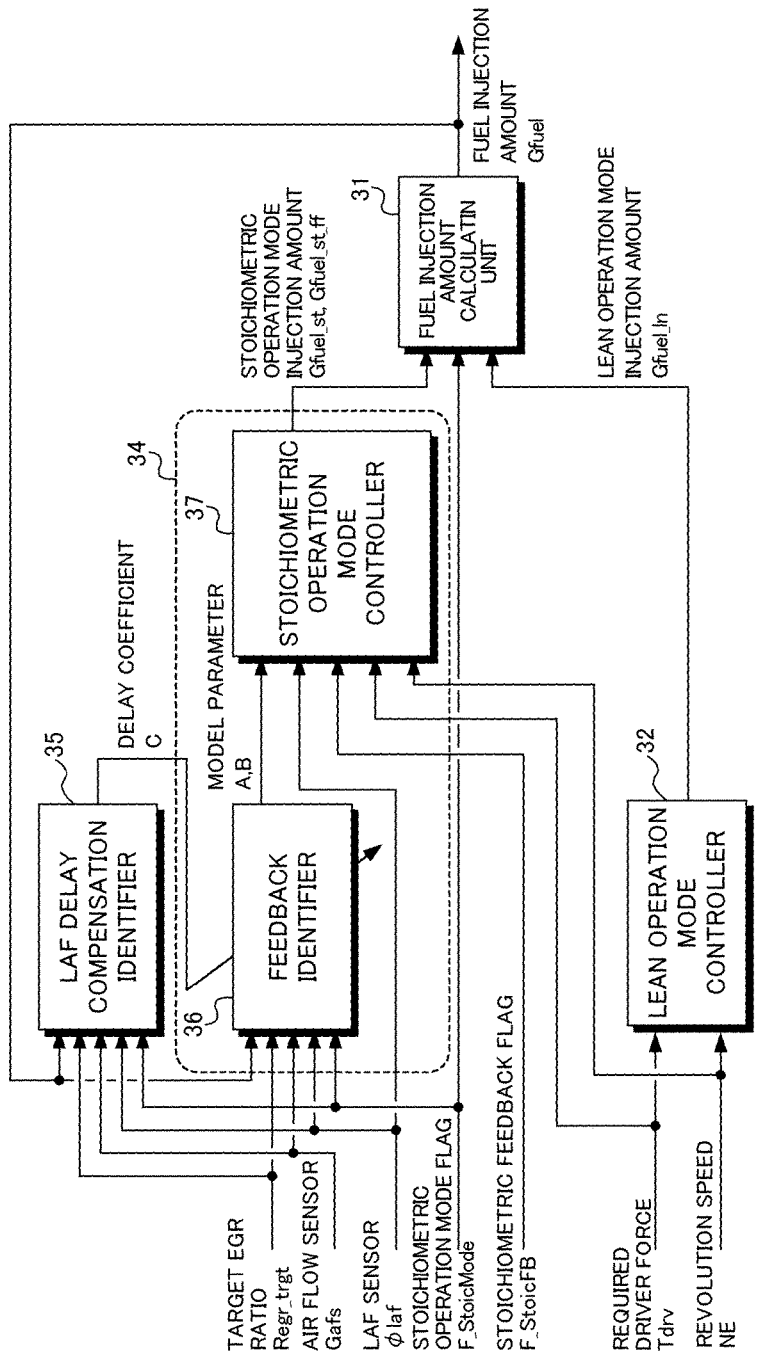
FIG. 9 is a block diagram related to execution of fuel injection control.

FIG. 9 is a block diagram related to execution of fuel injection control for determining the fuel injection amount Gfuel of the engine. This fuel injection control is realized by combining the functional blocks such as the fuel injection amount calculation unit 31, lean operation mode controller 32, adaptive feedback controller 34, and LAF delay compensation identifier 35.

The fuel injection amount calculation unit 31 selects any of a fuel injection amount Gfuel_ln calculated by the lean operation mode controller 32, and a fuel injection amount (Gfuel_st or Gfuel_st_ff) calculated by the adaptive feedback controller 33, according to the current operation mode of the engine. More specifically, the fuel injection amount calculation unit 31 determines any among the three fuel injection amounts Gfuel_ln, Gfuel_st_ff and Gfuel_st as the final fuel injection amount Gfuel as shown in formula (4) below, according to the values of the flag F_StoicMode and F_stoicFB updated following formulas (1) and (2) above.

$$Gfuel(k) = \begin{cases} Gfuel\_st\_ff(k) & (F\_StoicMode(k) = 1 \,\&\, F\_StoicFB(k) = 0) \\ Gfuel\_st(k) & (F\_StoicMode(k) = 1 \,\&\, F\_StoicFB(k) = 1) \\ Gfuel\_ln(k) & (F\_StoicMode(k) = 0) \end{cases} \quad (4)$$

In formula (4) above, the injection amount Gfuel_ln(k) is the fuel injection amount for during lean operation mode. The injection amount Gfuel_st_ff(k) is the injection amount during stoichiometric operation mode before starting stoichiometric feedback control. The injection amount Gfuel_st(k) is the injection amount for during stoichiometric feedback control.

First, the sequence for calculating the injection amount Gfuel_ln during lean operation mode will be explained.

Figure 10:
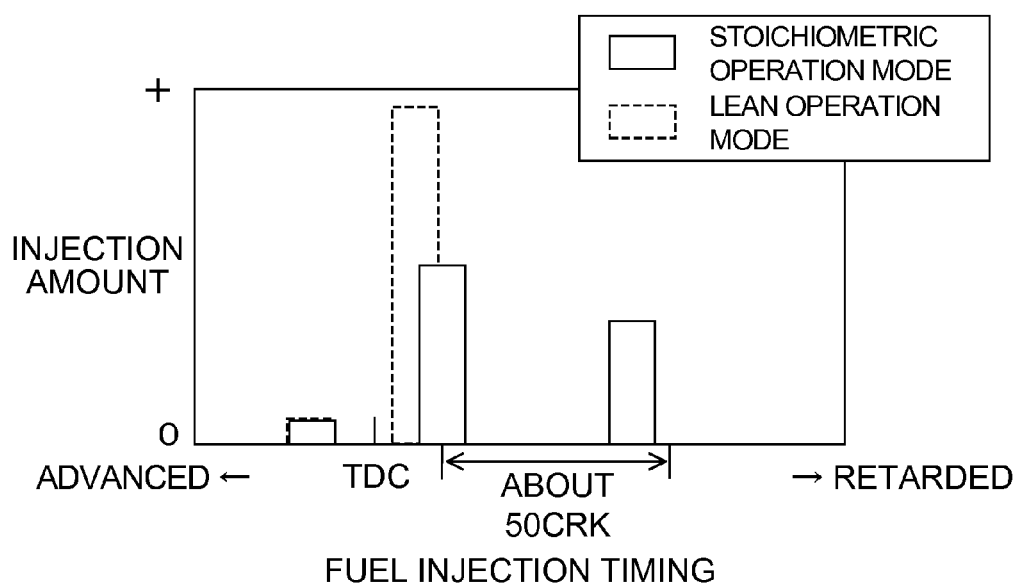
FIG. 10 is a graph showing an example of the injection patterns in lean operation mode and stoichiometric operation mode.

The lean operation mode controller 32 calculates the injection amount so that the driver required drive force is realized and such that the equivalence ratio of the air-fuel mixture becomes lean, based on the driver required drive force Tdrv and engine revolution speed NE, and determines this as the fuel injection amount Gfuel_ln for during lean operation mode. More specifically, the lean operation mode controller 32 determines the injection amount Gfuel_ln by searching a map for during lean operation mode established in advance (not illustrated) with the required drive force Tdrv and revolution speed NE as arguments. It should be noted that, regarding the map used in order to calculate the injection amount Gfuel_ln in this lean operation mode controller 32, a map established with the premise of the fuel injection amount being divided in a situation such as that shown by the dotted line in the center of FIG. 10 is used in the lean operation mode. In other words, during the lean operation mode, it is premised that main injection executed in the vicinity of top-dead center and pilot injection preceding this main injection are executed as shown by the dotted line in FIG. 10.

Next, referring back to FIG. 9, the sequence of calculating the injection amount Gfuel_st and Gfuel_st_ff during stoichiometric operation mode will be explained.

The adaptive feedback controller 34 models the physical system from the fuel injection amount Gfuel to the output φlaf of the LAF sensor with predetermined model equations, and determines the injection amount Gfuel_st during stoichiometric operation mode using this model. First, this model will be explained in detail, and then the sequence of specifically determining the injection amount Gfuel_st using this model will be explained.

The gas introduced to the cylinders of the engine is constituted from new air and EGR gas. Therefore, the equivalence ratio φexp of exhaust gas in the exhaust port of the engine is represented by formula (5-1) below, according to the immediately prior EGR rate Regr, equivalence ratio of new air φfsh and equivalence ratio φegr of EGR gas. The equivalence ratio φfsh of new air in formula (5-1) is calculated by dividing the fuel injection amount Gfuel by the new air amount Gfsh, and multiplying the stoichiometric air/fuel ratio αst (e.g., 14.6) (refer to formula (5-2) below). In addition, the EGR gas introduced into the cylinders of the engine is gas recirculated through the EGR channel over the time d after having passed the LAF sensor; therefore, the equivalence ratio φegr of EGR gas in formula (5-1) is appropriately set as the past output value φlaf(k-d) of the LAF sensor by the recirculation time d (refer to formula (5-3) below).

$$\varphi exp(k+1)=(1-Regr(k))\varphi fsh(k)+Regr(k)\varphi egr(k) \quad (5\text{-}1)$$

$$\varphi fsh(k)=\alpha st\ G\text{fuel}(k)/G fsh(k) \quad (5\text{-}2)$$

$$\varphi egr(k)=\varphi laf(k-d) \quad (5\text{-}3)$$

Therefore, formula (6) below is derived from these formulas (5-1) to (5-3).

$$\varphi exp(k+1) = \frac{\alpha st(1 - Regr(k))}{Gfsh(k)} Gfuel(k) + Regr(k)\varphi laf(k-d) \quad (6)$$

Among the physical amounts constituting formula (6) above, the EGR rate Regr and new air amount Gfsh are not amounts that can be directly observed. However, the EGR rate Regr can be substituted by the target value Regr_trgt thereof (refer to formula (3-4) above). In addition, the new air amount Gfsh can be substituted by the output of the air flow sensor Gafs. In other words, formula (7) below is derived using this target value Regr_trgt of the EGR rate and the output Gafs of the air flow sensor.

$$\varphi exp(k+1) = \frac{\alpha st(1 - Regr\_trgt(k))}{Gafs(k)} Gfuel(k) + Regr\_trgt(k)\varphi laf(k-d) \quad (7)$$

As shown in formula (7) above, the equivalence ratio φexp at the exhaust port is divided into a term proportional to the fuel injection amount Gfuel and an disturbance term that is not proportional to the fuel injection amount Gfuel. It should be noted that the disturbance term is proportional to the EGR rate, as shown in formula (7). A general diesel engine has a high EGR rate compared to a gasoline engine; therefore, the contribution of this disturbance term is relatively greater. For this reason, the present invention constructs a model in which this disturbance term is also accurately incorporated.

Next, by defining a proportional constant of the term proportional to the fuel injection amount Gfuel as a model parameter A(k) and defining the disturbance term by a model parameter B(k), a first model formula shown in formula (8) below is derived.

$$\varphi exp(k+1)=A(k)G\text{fuel}(k)+B(k) \quad (8)$$

In addition, the values of these model parameters A and B are defined by considering the error between the theoretical formula (7) above and the actual system (modeling error), and dividing into reference values Abs and Bbs calculated from a parameter Regr_trgt related to the EGR rate and correction values dA and dB as modeling error, as shown in formulas (9-1) to (9-4) below. According to the first model formula defined by these formulas (8) and (9-1) to (9-4), the modeling error by substituting the physical amounts Regr, Gfsh upon deriving the theoretical formula (7) above, and modeling error due to individual variation and ageing in the flow rate characteristics of the EGR control valve and fuel injection valves, and observed precision of the air flow meter and LAF sensor are expressed by these two correction values dA and dB.

$$A(k) = \text{Abs}(k) + dA(k) \quad (9\text{-}1)$$

$$B(k) = \text{Bbs}(k) + dB(k) \quad (9\text{-}2)$$

$$\text{Abs}(k) = \frac{\alpha st(1 - Regr\_trgt(k))}{Gafs(k)} \quad (9\text{-}3)$$

$$\text{Bbs}(k) = Regr\_trgt(k)\varphi laf(k-d) \quad (9\text{-}4)$$

In addition, there is a response delay characteristic in the LAF sensor. This response delay characteristic varies according to individual variation and ageing. Particularly in a case of a diesel engine or direct-injection gasoline engine, since soot is contained in the exhaust gas, the response delay characteristic of the sensor varies due to this soot adhering to the detection element of the LAF sensor. There is such a response delay characteristic in the output φlaf of the LAF sensor, and when this characteristic is expressed by the first order delay coefficient C, a second model formula shown in formula (10) below is derived between the output φlaf of the LAF sensor and the equivalence ratio φexp of exhaust gas in the exhaust port. Hereinafter, the coefficient C in this second model formula is referred to as the response delay coefficient of the LAF sensor.

$$\varphi laf(k)=(1-C(k-1))\varphi laf(k-1)+C(k-1)\varphi exp(k-d') \quad (10)$$

Summarizing the above, the system from the fuel injection amount Gfuel to the output φlaf of the LAF sensor is modeled by the first model formula (formulas (8) and (9-1) to (9-4) above) and the second model formula (formula (10) above). Hereinafter, a model constituted by these first and second model formulas is referred to as an injection amount-sensor output model. In addition, the system from the equivalence ratio φexp of exhaust gas at the exhaust port to the output φlaf of the LAF sensor is constituted only by the second model formula. Hereinafter, a model constituted by this second model formula is referred to as a port equivalence ratio-sensor output model.

Referring back to FIG. 9, the adaptive feedback controller 34 includes the feedback identifier 36 and the stoichiometric operation mode controller 37.

The feedback identifier 36 uses the aforementioned injection amount-sensor output model to successively identify the values of the model parameters A and B included in this model at a predetermined timing.

The stoichiometric operation mode controller 37 calculates the injection amount Gfuel_st for during stoichiometric feedback control using the model parameters A and B for which the values thereof were identified by the feedback identifier 36.

In addition, the LAF delay compensation identifier 35 successively identifies the value of the response delay coefficient C included in this model, using the aforementioned port equivalence ratio-sensor output model. It should be noted that, as shown in FIG. 9, the LAF delay compensation identifier 35 is configured separately from the above-mentioned feedback identifier 36, and makes it possible to identify the value of the response delay coefficient C by an independent computation from the feedback identifier 36.

Hereinafter, the sequence of computations executed by this feedback identifier 36, stoichiometric operation mode controller 37 and LAF delay compensation identifier 35 will be explained in order.

The feedback identifier 36 uses the injection amount-sensor output model, and defines the estimated value φexp_hat of the equivalence ratio of exhaust gas at the exhaust port and the estimated value φlaf_hat for the LAF sensor output by formulas (11-1) and (11-2) below.

$$\varphi exp\_hat(k)=A(k-1)Gfuel(k-1)+B(k-1) \quad (11\text{-}1)$$

$$\varphi laf\_hat(k)=(1-C(k-1))\varphi laf\_hat(k-1)+C(k-1)\varphi exp\_hat(k-d') \quad (11\text{-}2)$$

The feedback identifier 36 defines the identification error E_id(k) between the output value φlaf(k) of the LAF sensor and the estimated value φlaf_hat(k) of the LAF sensor output derived from the above-mentioned model formulas (11-1) and (11-2) by formula (12) below, and successively identifies the values A(k) and B(k) of two model parameters so that this identification error E_id(k) becomes a minimum.

$$E\_id(k)=\varphi laf(k)-\varphi laf\_hat(k) \quad (12)$$

As an algorithm used in the identification of these two model parameters A and B, for example, the successive-type least-squares method explained below is suited.

In this case, first, a model parameter vector Θ with the model parameters A and B as components is defined by formula (13) below.

$$\theta(k)=[A(k),B(k)] \quad (13)$$

However, as shown in formulas (9-3) and (9-4) above, the model parameters A and B include the EGR rate, respectively, and thus the values thereof greatly fluctuate. For this reason, when directly identifying the value of this model parameter vector Θ, the modeling error desired to be specified may be hidden by the fluctuation in EGR rate, and thus successive precise identifying is difficult. Therefore, this model parameter vector Θ is defined by the sum of a base vector Θbs that can be successively computed according to a parameter such as EGR rate, and a correction vector dΘ corresponding to the modeling error (refer to formulas (14-1) and (14-2) below). Herein, the components Abs and Bbs of the base vector Θbs use those defined in model formulas (9-3) and (9-4).

$$\theta(k)=\theta bs(k)+d\theta(k) \quad (14\text{-}1)$$

$$\theta bs(k)=[Abs(k),Bbs(k)] \quad (14\text{-}2)$$

The correction vector dΘ minimizing the identification error E_id (refer to formula (12) above) is calculated with formula (15) below, according to the successive-type least-squares method algorithm.

$$d\theta(k) = \begin{cases} \Lambda d\theta(k-1) + Kp(k)E\_id(k) & (F\_StoicMode(k)=1) \\ [0,0] & (F\_StoicMode(k)=0) \end{cases} \quad (15)$$

Herein, the matrix Λ is a forgetting matrix, and is defined by formula (16-4) below. The diagonal components λ1, λ2 of the forgetting matrix Λ are set between 0 and 1, respectively.

In addition, either of λ1, λ2 is preferably set to 1. In addition, the matrix Kp is a model parameter updated gain matrix, and is defined by formula (16-1) below. In this formula (16-1), the matrix P is an adaptive gain matrix, and is defined by formula (16-3) below. The diagonal components p1, p2 of the adaptive grain matrix P are set to positive values, respectively. In addition, the vector ζ is an input/output vector, and is defined by formula (16-2) below.

$$KP(k) = \frac{P\varsigma(k)}{1+\varsigma^T(k)P\varsigma(k)} \quad (16\text{-}1)$$

$$\varsigma^T = [Gfuel(k-1), 1] \quad (16\text{-}2)$$

$$P = \begin{bmatrix} p1 & 0 \\ 0 & p2 \end{bmatrix} \quad (16\text{-}3)$$

$$\Lambda = \begin{bmatrix} \lambda1 & 0 \\ 0 & \lambda2 \end{bmatrix} \quad (16\text{-}4)$$

In addition, as shown in formula (15) above, the feedback identifier 36 updates the values of the model parameters A, B so that the identification error E_id becomes a minimum, in response to the stoichiometric operation mode having begun (F_StoicMode: 0→1). In other words, the update of the values of the model parameters A and B is started before the stoichiometric feedback control starts. In addition, the feedback identifier 36 sets the values of the model parameters A, B to the reference values Abs, Bbs in the lean operation mode (F_StoicMode=0).

Next, computations executed in the stoichiometric operation mode controller 37 will be explained. The stoichiometric operation mode controller 37 determines the feed-forward injection amount Gfuel_st_ff for during stoichiometric operation mode start, and the injection amount Gfuel_st for during stoichiometric feedback control according to respectively different algorithms, as explained in order below.

The feed-forward injection amount Gfuel_st_ff for during stoichiometric operation mode start is determined by searching a map (not illustrated) for during stoichiometric operation mode established in advance, with the driver required drive force Tdrv and engine revolution speed NE as arguments, in the stoichiometric operation mode controller 37. It should be noted that this map for during stoichiometric operation mode differs from the map referenced in the aforementioned lean operation mode controller 32, and values set so that the output of the LAF sensor becomes stoichiometric are used for the arguments such as the above-mentioned required drive force Tdrv and revolution speed NE. In addition, for this map for during stoichiometric operation mode, a map established on the premise of separating the fuel injection amount in the situation such as that shown by the solid line in FIG. 10 is used in the stoichiometric operation mode. In other words, during stoichiometric operation mode, it is premised on executing after injection executed in the expansion stroke, in addition to the main injection and pilot injection, as shown by the solid line in FIG. 10.

The injection amount Gfuel_st for during stoichiometric feedback control is calculated based on the two model parameters A, B of the above-mentioned injection amount-sensor output model, in the stoichiometric operation model controller 37. More specifically, the stoichiometric operation mode controller 37 first sets the target value (target equivalence ratio) φtrgt, for the equivalence ratio φexp of the exhaust gas at the exhaust port, to 1 (refer to formula (17) below) corresponding to stoichiometric, or to a value in the vicinity of stoichiometric set in advance or a value in the vicinity of stoichiometric calculated according to a predetermined algorithm, so that the three-way purification reaction progresses on the direct-downstream catalyst.

$$\varphi trgt(k)=1 \qquad (17)$$

In addition, the stoichiometric operation mode controller 37 determines the injection amount Gfuel_st (refer to formula (18-1) below) so that the equivalence ratio φexp (refer to formula (8) above) calculated using the model parameters A, B becomes the target equivalence ratio φtrgt established according to formula (17) above. It should be noted that formula (18-1) below is derived by the target equivalence ratio φtrgt in formula (17) above being made equal to the equivalence ratio φexp derived from the model formula (8), as shown in formula (18-2).

$$Gfuel\_st(k) = \frac{\varphi trgt(k) - B(k)}{A(k)} \qquad (18\text{-}1)$$

$$\varphi trgt(k) = \varphi\exp(k+1) = A(k)Gfuel(k) + B(k) \qquad (18\text{-}2)$$

Next, the effects of the adaptive stoichiometric controller 34 configured in the above way will be explained by referencing FIGS. 11 to 13.

Figure 11:
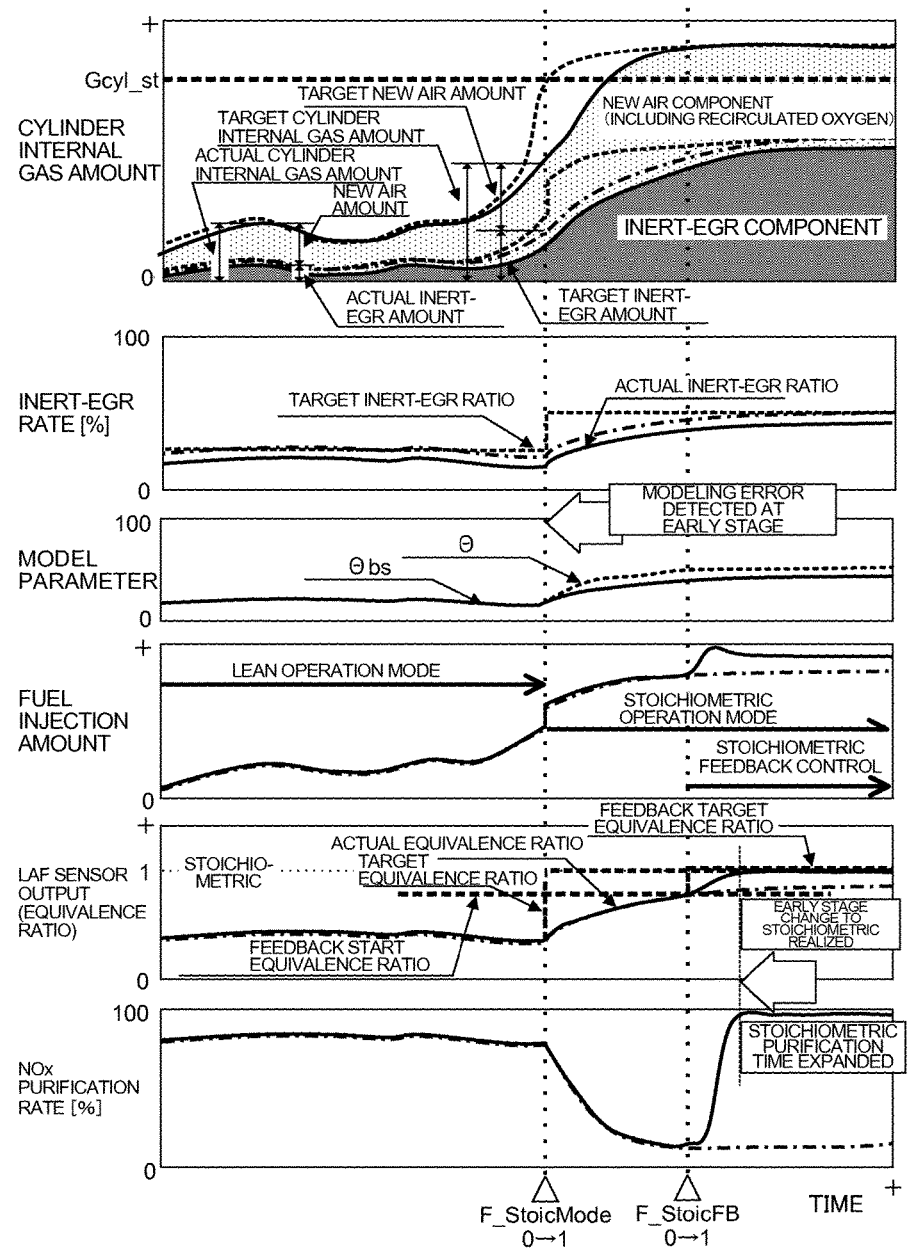
FIG. 11 provides graphs illustrating the concept of equivalence control realized by an adaptive stoichiometric controller.

FIG. 11 provides graphs illustrating the concept of equivalence ratio control realized by adaptive stoichiometric controller 34. FIG. 11 shows, in order from the top, a breakdown of gas introduced to the cylinder, Inert-EGR rate (%), model parameter vectors Θ and Θbs identified by the feedback identifier 36, fuel injection amount, LAF sensor output and NOx purification rate (%).

As shown in FIG. 11, the operation mode of the engine switches from the lean operation mode to stoichiometric operation mode (refer to formula (1) above), in response to the target cylinder internal gas amount Gcyl_trgt surpassing the threshold Gcyl_st_dnx or Gcyl_st_aes.

When the operation mode switches to the stoichiometric operation mode (F_StoicMode: 0→1), the feedback identifier 36 updates the value of the model parameter vector Θ so that the error between the output value of the LAF sensor and the estimated value according to the fuel injection amount-sensor output model becomes a minimum (refer to formula (15) above). The value of the model parameter Θ thereby changes from the reference value Θbs, as shown in FIG. 11. In other words, from the moment when switching to the stoichiometric operation mode, the error between the actual system and model is detected by the feedback identifier 36. In addition, when the operation mode switches to the stoichiometric operation mode, the fuel injection amount Gfuel is transferred from the injection amount Gfuel_ln for during the lean operation mode to the feed-forward injection amount Gfuel_st_ff for during stoichiometric operation mode (refer to formula (4) above). From the start of stoichiometric operation mode and after, the output of the LAF sensor thereby rises towards stoichiometric.

During stoichiometric operation mode, when the output φlaf of the LAF sensor surpasses the feedback start threshold φfb, the stoichiometric purification flag F_StoicFB switches from 0 to 1, and the stoichiometric feedback control begins (refer to formula (2) above).

When the stoichiometric feedback control begins, the fuel injection amount Gfuel is transferred from the feed-forward injection amount Gfuel_st_ff to the injection amount Gfuel_st for during stoichiometric feedback control (refer to formula (4) above). In addition, this injection amount Gfuel_st is determined so that the equivalence ratio φexp of the exhaust port obtained from the model formula (8) becomes the target value (stoichiometric) (refer to formulas (17) and (18-1) above). From the start of stoichiometric feedback control and after, the output of the LAF sensor is thereby controlled to stoichiometric, and the three-way purification reaction progresses by way of the direct-downstream catalyst, as shown in FIG. 11.

With the adaptive stoichiometric controller 34 of the present invention, by detecting the modeling error with the feedback identifier at an early stage from the moment when the operation mode switches from the lean operation mode to the stoichiometric operation mode, before starting such stoichiometric feedback control, it becomes possible to control the output of the LAF sensor at an early stage accurately to stoichiometric. In addition, it thereby becomes possible to ensure the time for which it is possible to advance the three-way purification reaction on the direct-downstream catalyst (stoichiometric purification time) for as long as possible.

Figure 12:
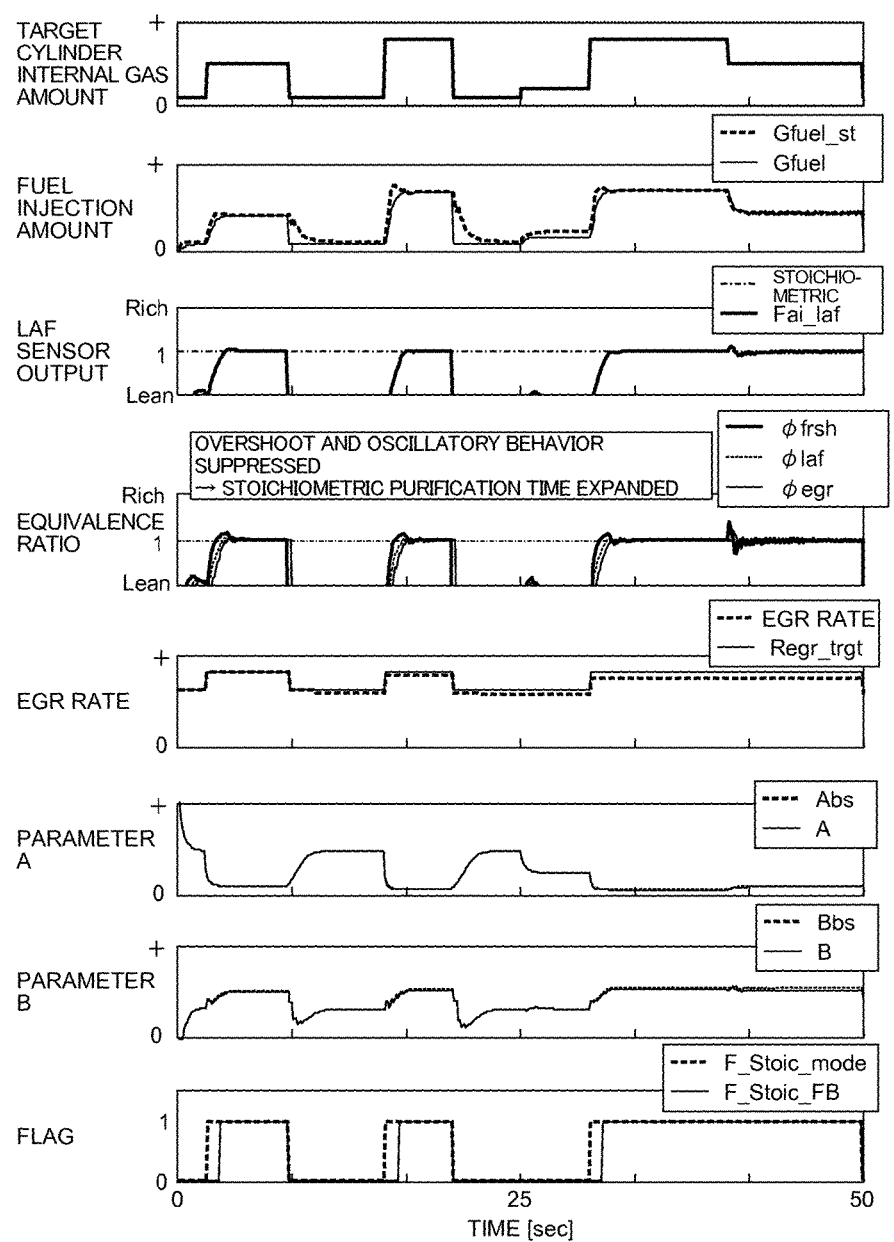
FIG. 12 provides graphs showing the simulation results of the adaptive stoichiometric controller.

FIG. 12 provides graphs showing simulation results of the adaptive stoichiometric controller. FIG. 12 shows the changes in fuel injection amount, LAF sensor output, equivalence ratios of each portion (φfsh, φexp, φegr), EGR rate, model parameters A, B and flags when causing the target cylinder internal gas amount to a situation such as that of the drawing.

As shown in FIG. 12, when the target cylinder internal gas amount increases, in response thereto, the stoichiometric purification mode flag F_StoicMode is set to 1, and subsequently, the stoichiometric feedback flag F_StoicFB is set to 1. In addition, as shown in FIG. 12, according to the adaptive stoichiometric controller of the present invention, it was verified that it is possible to control to stoichiometric with high precision, during stoichiometric feedback control, without the output of the LAF sensor exhibiting overshoot or oscillating behavior.

In particular, this simulation of FIG. 12 was performed under conditions assuming that there is individual variation and ageing in the EGR device, and such that steady-state error occurred between the EGR rate Regr and the target value thereof Regr_trgt. The adaptive stoichiometric controller detects the individual variation, etc. of this EGR device as error from the reference values Abs, Bbs of the model parameters A, B, from immediately after the stoichiometric operation mode begins. For this reason, the adaptive stoichiometric controller can control the equivalence ratio of the air-fuel mixture with high precision, irrespective of individual variation, etc. in the EGR device, fuel injection valves, air flowmeter, etc.

Figure 13:
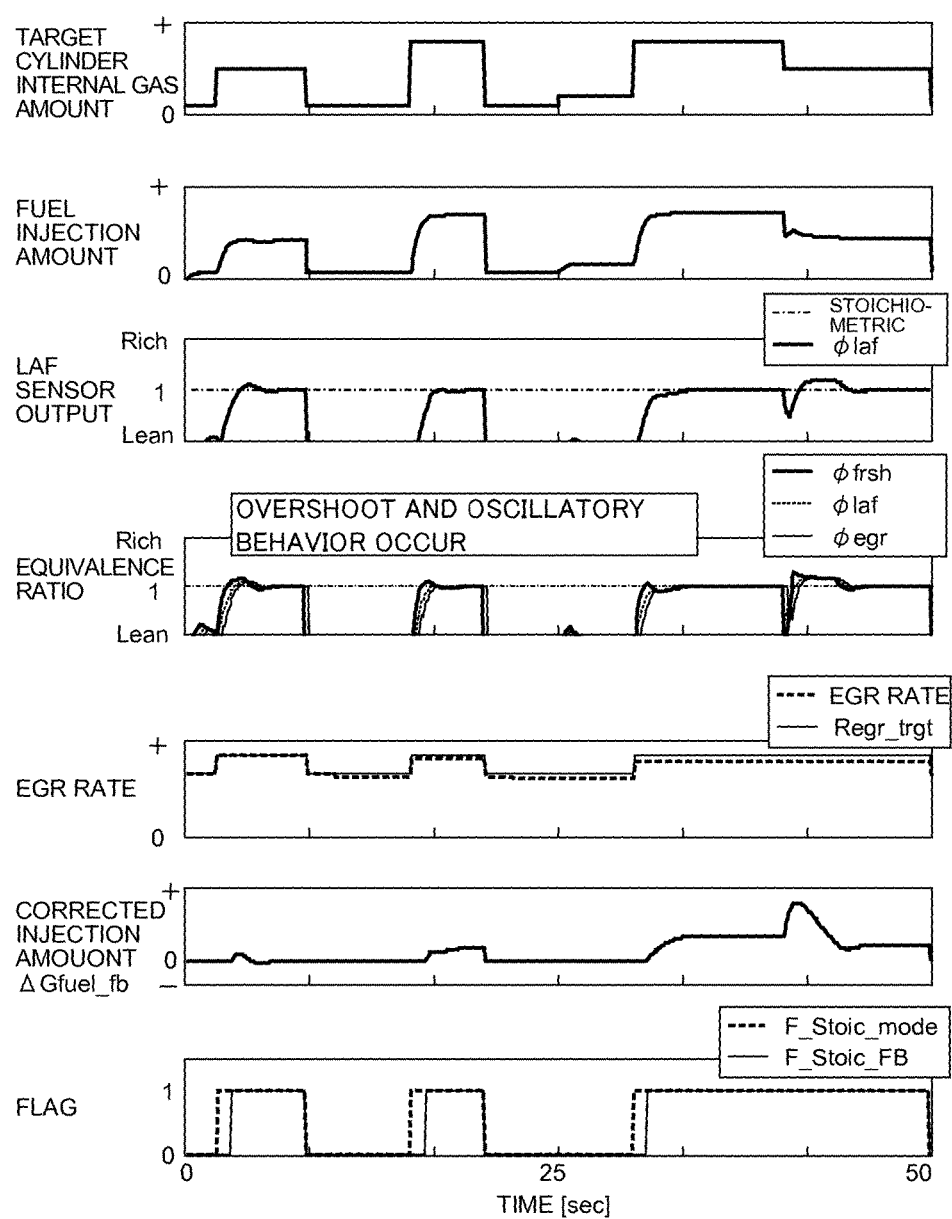
FIG. 13 provides graphs showing the simulation results of a conventional device.

FIG. 13 provides graphs showing the simulation results of a conventional device. Herein, conventional device refers to a device in which stoichiometric feedback control differs from the above-mentioned adaptive stoichiometric controller, and determines the correction injection amount ΔGfuel_fb corresponding to the above-mentioned feed-forward injection amount Gfuel_st_ff with a known PI controller, with the error E_phi between the output value φlaf of the LAF sensor and the target value thereof (stoichiometric) as an input. In addition, other simulation conditions are the same as FIG. 12.

The individual variation, etc. arising in the aforementioned such EGR device, etc. can be detected by a conventional PI controller. For this reason, the output value of the LAF sensor can be made stoichiometric also by the conventional device, as shown in FIG. 13. However, as is evident by comparing the behaviors of the LAF sensor output and equivalence ratio parameter between FIG. 13 and FIG. 12, the overshoot and oscillatory behavior stands out in the output of the LAF sensor with the conventional device. This is because the compensation delay for the deviation is not avoided with a PI controller based on the deviation input of a conventional LAF sensor. For this reason, the stoichiometric purification time becomes shorter. From the above, the superiority of the adaptive stoichiometric controller of the present embodiment has been verified.

Next, referring back to FIG. 9, the sequence of computations performed by the LAF delay compensation identifier 35 will be explained.

The LAF delay compensation identifier 35 identifies the value of the delay coefficient C (refer to formula (10) above) included in the fuel injection amount-sensor output model used in the adaptive stoichiometric controller 33. First, the influence that the error of this delay coefficient C exerts on the control results of the above-mentioned adaptive stoichiometric controller 33 will be explained.

Figure 14:
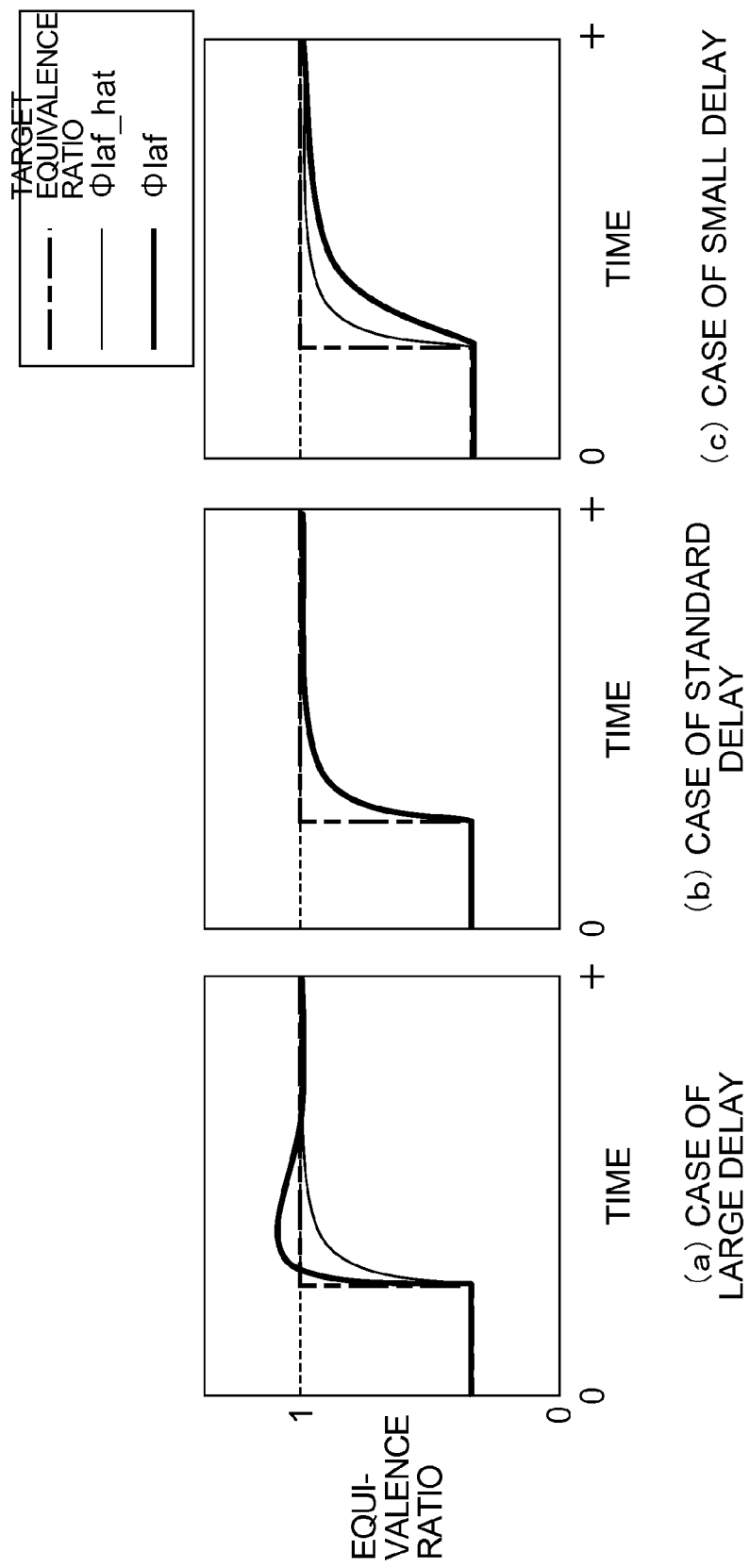
FIG. 14 provides graphs showing the influence that the estimation error of a response delay characteristic of an LAF sensor exerts on the control results.

FIG. 14 provides graphs showing the influence that the estimation error of the response delay characteristic of the LAF sensor exerts on the control results. As mentioned above, the adaptive stoichiometric controller identifies the values of the model parameters A and B so that the estimated value $\varphi laf\_hat$ of the output of the LAF sensor matches the output value $\varphi laf$ of the LAF sensor under the delay coefficient C identified by the LAF delay compensation identifier, determines the fuel injection amount based on these model parameters A and B. Therefore, as a result of determining the fuel injection amount in this way, it is necessary for the value of the delay coefficient C to be accurately identified in order for the actual output $\varphi laf$ of the LAF sensor as assumed by the model to match with the estimated value $\varphi laf\_hat$. In other words, when there is error in the delay coefficient C calculated by the LAF delay compensation identifier, a shift arises in the model parameters A and B identified by the feedback identifier, a result of which the actual output value $\varphi laf$ of the LAF sensor exhibits a behavior differing from the estimated value $\varphi laf\_hat$. FIG. 14(a) shows the behavior in the case of the delay of the actual LAF sensor being greater than estimated, FIG. 14(b) shows the behavior in the case of the delay of the actual LAF sensor being substantially the same as estimated, and FIG. 14(c) shows the behavior in the case of the delay of the actual LAF sensor being less than estimated.

As shown in FIG. 14(b), if the delay coefficient C is accurately estimated, the estimated value $\varphi laf\_hat$ and the actual output value $\varphi laf$ of the LAF sensor will exhibit the same behavior. In contrast, as shown in FIG. 14(a) or (c), when there is error in the estimation of the delay coefficient C, the actual output value $\varphi laf$ overshoots and is delayed relative to the estimated value $\varphi laf\_hat$. For this reason, the stoichiometric purification time shortens.

For the above such reasons, it is necessary for the value of the delay coefficient C to be successively identified accurately. Additionally, the delay characteristic of this LAF sensor greatly varies depending on the exhaust gas volume. In other words, the value of the delay coefficient C comes to greatly vary successively depending on the operating state. Hereinafter, an algorithm that accurately identifies the delay coefficient C which greatly fluctuates in this way, and having a characteristic that varies according to individual variation, etc. will be explained.

The LAF delay compensation identifier 35 identifies the value of the delay coefficient C using the model formula (refer to formula (19) below) obtained by replacing the equivalence ratio $\varphi exp$ at the exhaust port that cannot be practically observed, with an estimated value $\varphi exp\_hat$ that can be calculated from formula (11-1), in the model formula (10) of the port equivalence ratio-sensor output model.

$$\varphi laf(k)=(1-C(k-1))\varphi laf(k-1)+C(k-1)\varphi exp\_hat(k-d') \quad (19)$$

However, in formula (19) above, since the delay coefficient $C(k-1)$ is multiplied by both variables $\varphi laf$ and $\varphi exp\_hat$, it is no longer possible to identify with a common identification algorithm. Therefore, a virtual output $W(k)$ and estimated value thereof $W\_hat(k)$ are defined as shown in formulas (20-1) and (20-2) below. The matter of identifying the value of the delay coefficient C so that formula (19) above is satisfied and the matter of calculating the value of the delay coefficient C so that the error between the virtual output W and estimated value thereof W_hat reaches a minimum thereby become equivalent.

$$W(k)=\varphi laf(k)-\varphi laf(k-1) \quad (20\text{-}1)$$

$$W\_hat(k)=C(k-1)(\varphi exp\_hat(k-d')-\varphi laf(k-1)) \quad (20\text{-}2)$$

Figure 15:
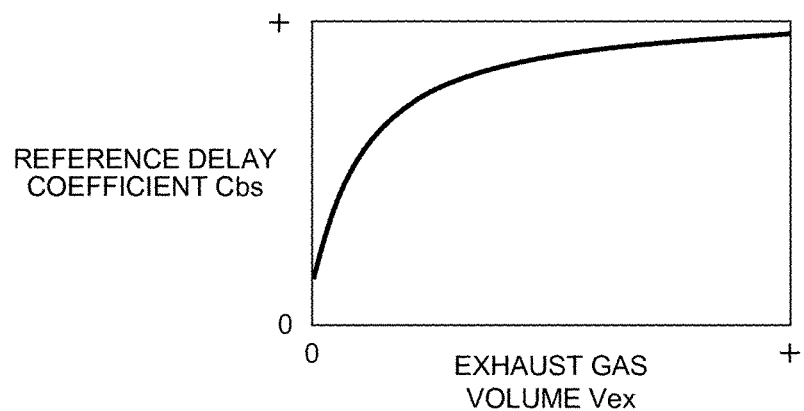
FIG. 15 is a graph showing an example of a map for determining a reference delay coefficient.
Figure 21:
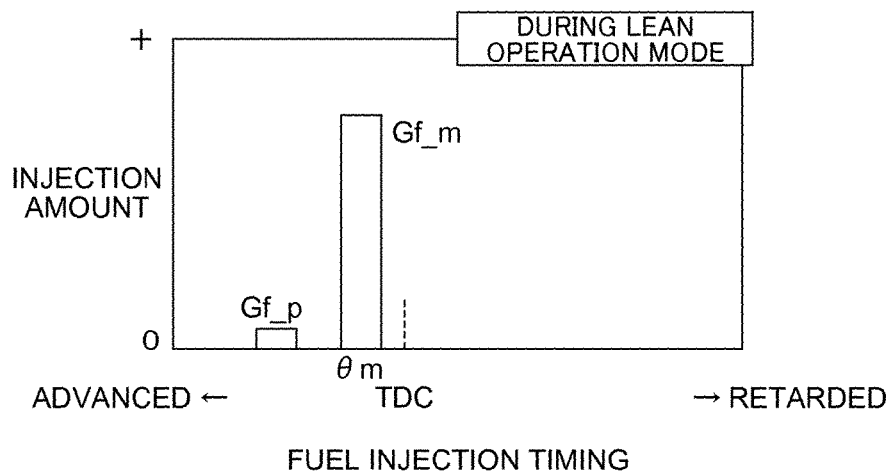
FIG. 21 is a graph showing an example of an injection pattern in the lean operation mode.
Figure 22:
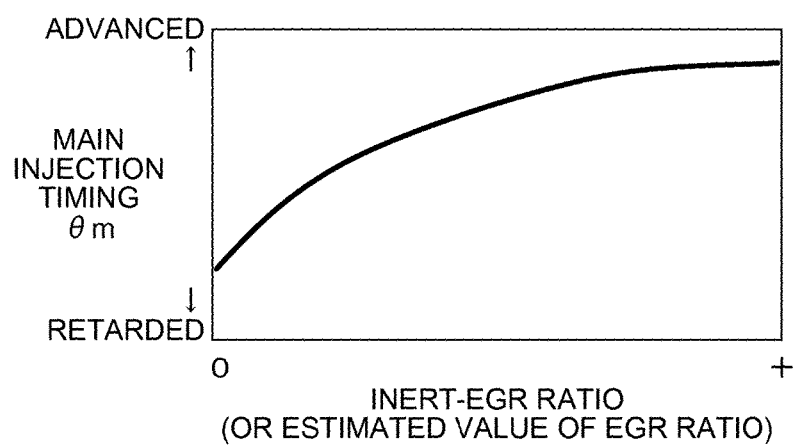
FIG. 22 is a graph showing an example of a map for determining a main injection timing.

In addition, the delay characteristic of the LAF sensor has a characteristic of varying depending on the exhaust gas volume. More specifically, there is a characteristic of the delay characteristic of the LAF sensor becoming smaller as the exhaust gas volume increases. It is difficult to directly calculate a value that greatly fluctuates successively in this way, so that the error between the above-mentioned virtual output W and estimated value W_hat reaches a minimum, and the error is great. Therefore, the LAF delay compensation identifier 35 defines a base delay coefficient $Cbs(k)$ as a function of the exhaust gas volume as shown in FIG. 15, and separates the delay coefficient $C(k)$ into the product of the base delay coefficient $Cbs(k)$ and a correction factor $Kc(k)$ of the delay coefficient as shown in FIG. 21 described below. In other words, the delay coefficient $C(k)$ is separated into the product of the reference value $Cbs(k)$ that varies with the cause of the exhaust gas volume, and the correction factor $Kc(k)$ that varies with other causes such as the individual variation and soot adhesion. By defining the delay coefficient $C(k)$ in this way, the part among the delay coefficient $C(k)$ that greatly fluctuates successively by the exhaust gas volume can be calculated by searching a map such as that shown in FIG. 15, with the exhaust gas volume as an argument, without going through an identification algorithm.

$$C(k)=Kc(k)Cbs(k) \quad (21)$$

As mentioned above, if there is individual variation in the detection characteristic of the LAF sensor, or soot adheres to the detection element, the exhaust gas volume characteristic of the delay coefficient C of the LAF sensor is considered to vary from the base delay coefficient Cbs shown in FIG. 15. However, the shift from this base delay coefficient Cbs is not uniform relative to the size of exhaust gas volume. Therefore, in order to reproduce such a non-linear property, the correction factor $Kc(k)$ of the above-mentioned delay coefficient is defined as a linear combination of a plurality of weighting functions $\omega i(k)$ in which the exhaust gas volume is an argument, as shown in formula (22) below. Hereinafter, a coefficient $Kc\_i$ accompanying the respective weighting functions ωi(k) is referred to as a local correction factor. In addition, hereinafter, a case of establishing the number of weighting functions as three will be explained as an example.

$$Kc(k) = \sum_{i=1}^{3} \varphi i(k) Kc\_i(k) \qquad (22)$$

Figure 16:
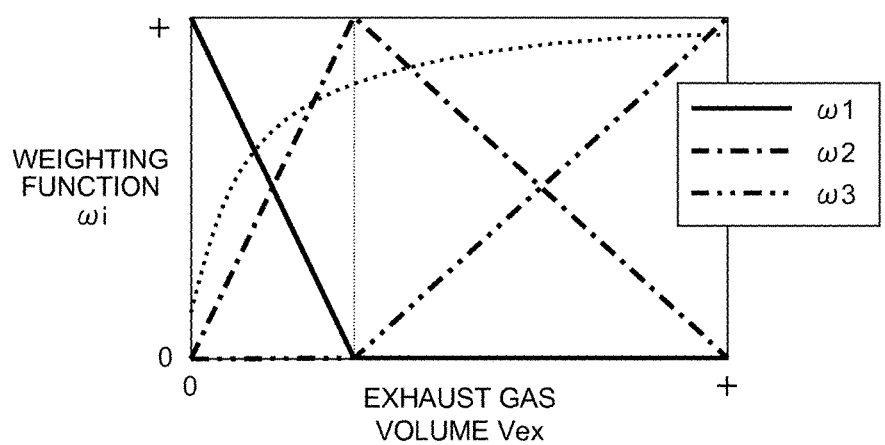
FIG. 16 is a graph showing a setting example of a weighting function.

FIG. 16 is a graph showing a setting example of weighting functions ωi.

As shown in FIG. 16, for the exhaust gas volume varying from 0 to a predetermined upper limit value, it is set so that the defined range of respective weighting functions ωi overlap, and the sum of values of the weighting functions ωi become equal for all exhaust gas volumes. In addition, in a region in which the base delay coefficient Cbs greatly changes, it is considered that the error thereof also greatly changes. For this reason, as shown in FIG. 16, in the region in which the base delay coefficient Cbs greatly changes (region in which exhaust gas volume is small), it is preferable to set so that the weighting functions ωi are close.

The LAF delay compensation identifier, upon representing the delay coefficient C(k) in the above way by the linear combination of local correction factors Kc_i, identifies the value of respective local correction factors Kc_i so that the identification error E_id' between the virtual output W and the estimated value thereof W_hat reaches a minimum. In addition, as the algorithm identifying the value of this local correction factor Kc_i, when adopting a successive least-squares method algorithm, the value of the local correction factor Kc_i is represented by formula (23) below.

$$Kc\_i(k) = Kc\_i(k-1) + Kp'(k)\omega i(k) E\_id'(k) \qquad (23)$$

In formula (23) above, the coefficient Kp' is a correction gain, and is represented by formula (24-1) below. In formula (24-1) below, the coefficient P is an adaptive gain, and is set to a predetermined positive value. In addition, the coefficient ζ' is a delay coefficient identification virtual input value, and is represented by formula (24-2) below.

$$Kp'(k) = \frac{P\varsigma'(k)}{1 + P\varsigma'(k)^2} \qquad (24\text{-}1)$$

$$\varsigma(k) = Cbs(k-1)(\varphi\exp\_hat(k-d') - \varphi laf(k-1)) \qquad (24\text{-}2)$$

It should be noted that, steady-state error arising from individual variation, ageing, etc. of the fuel injection valves, EGR device, air flow sensor, etc. can be included in the aforementioned estimated value φexp_hat of the equivalence ratio. For this reason, when identifying the delay coefficient C(k) so that the estimated value W_hat of the virtual input calculated from this estimated value φexp_hat and the virtual input W always match, this error may accumulate and error may arise in the delay coefficient C(k). In addition, the delay coefficient C(k) is a coefficient representing the transitional characteristic of the output of the LAF sensor. Therefore, the value of the delay coefficient C(k) preferable is identified while the output of the LAF sensor is changing. For the above reason, the LAF delay compensation identifier updates the value of the delay coefficient C(k) only at a transitory time in which a significant change appears in the output value of the LAF sensor. More specifically, the LAF delay compensation identifier updates the value of the transient judgment flag F_Trans in response to fluctuation in the output value of the LAF sensor as shown in formula (25-1) below, and inputs identification error that is not zero only while determining as being a transient state as shown in formula (25-2) below.

$$F\_Trans(k) = \begin{cases} 1 & (|\varphi laf(k) - \varphi laf(k-1)| \geq \Delta\varphi laf\_Trans) \\ 0 & (|\varphi laf(k) - \varphi laf(k-1)| < \Delta\varphi laf\_Trans) \end{cases} \qquad (25\text{-}1)$$

$$E\_id'(k) = \begin{cases} W(k) - W\_hat(k) & (F\_Trans(k) = 1) \\ 0 & (F\_Trans(k) = 0) \end{cases} \qquad (25\text{-}2)$$

Figure 17:
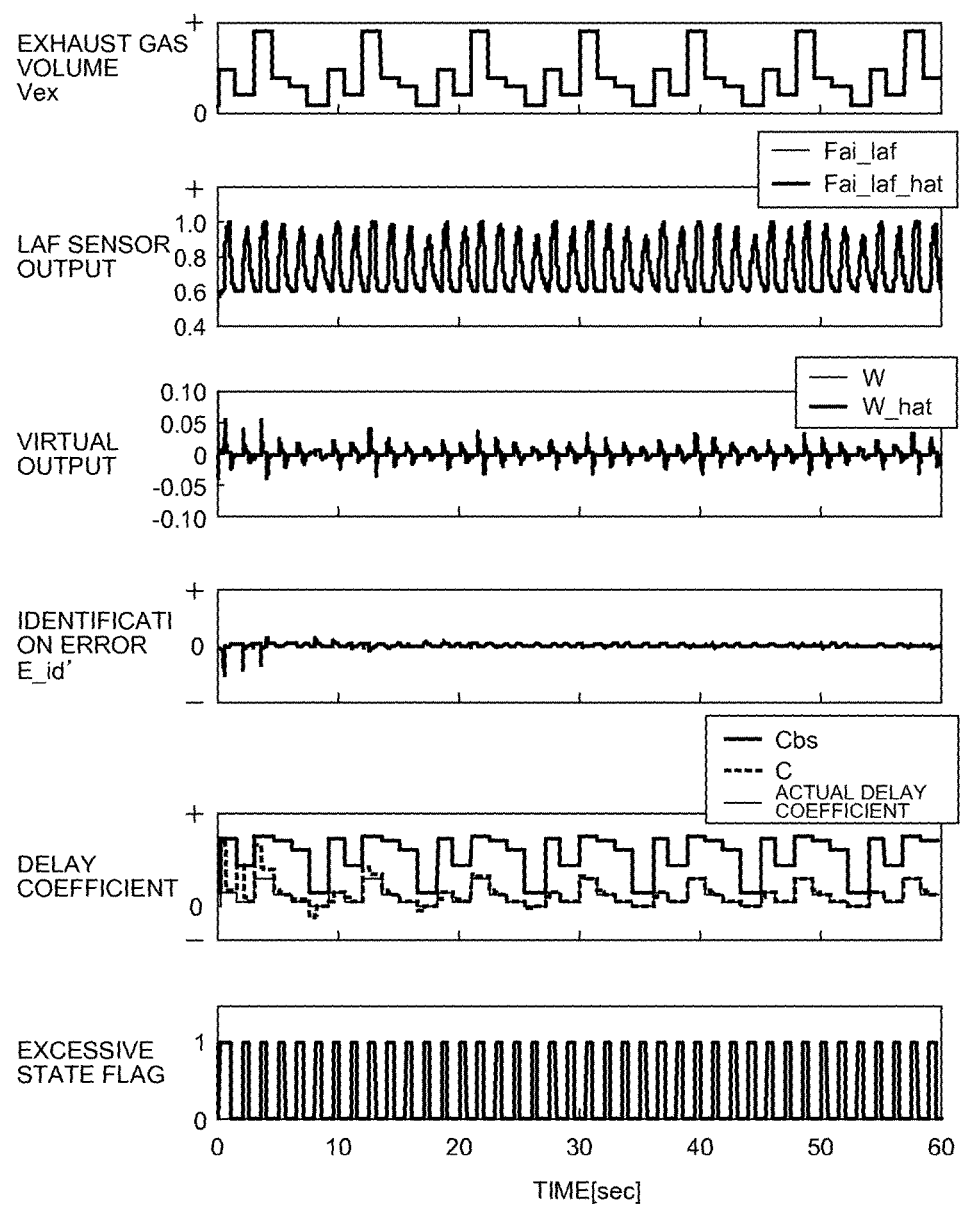
FIG. 17 provides graphs showing the simulation results of an LAF delay compensation identifier.

FIG. 17 provides graphs showing the simulation results of an LAF delay compensation identifier. FIG. 17 shows the change in the output of the LAF sensor, virtual input W, identification error E_id', delay coefficient C and transient judgment flag F_Trans, when causing the exhaust gas volume to change in the situation shown in the drawing.

As shown in FIG. 17, when causing the exhaust gas volume to change periodically, the output of the LAF sensor changes periodically, and in response thereto, the transient judgment flag F_Trans also changes periodically. In addition, the value of the delay coefficient C(k) is updated only while the transient judgment flag F_Trans is 1. Herein, when focusing on the behavior of the delay coefficient C in FIG. 17, it first transitioned to the reference value Cbs side away from the actual delay coefficient; whereas, with the elapse of time, the delay coefficient C comes to exhibit substantially the same behavior as the actual delay coefficient. In addition, the value of the identification error E_id' at this time also comes to converge to 0 along with the elapse of time. From the above, the superiority of the LAF delay compensation identifier of the present embodiment has been verified.

Figure 18:
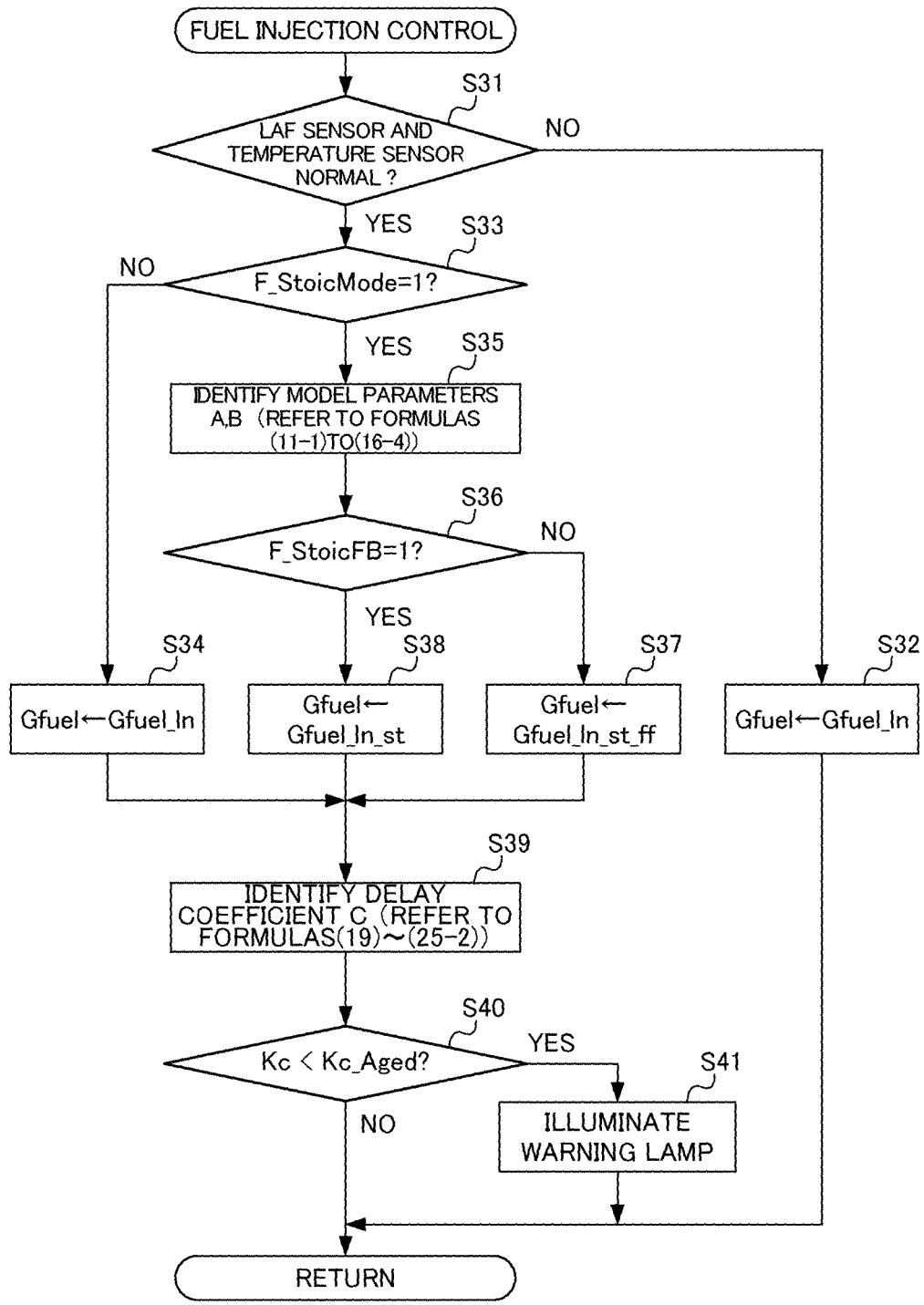
FIG. 18 is a flowchart showing the sequence of fuel injection control.

FIG. 18 is a flowchart showing the sequence of the above such fuel injection control. In this fuel injection amount control, the ECU determines the fuel injection amount Gfuel according to the operating mode by way of the sequence shown below.

In Step S31, the ECU determines whether various sensors related to the execution of fuel injection control are normal, such as the LAF sensor and temperature sensors. In the case of the determination in Step S31 being NO, the ECU advances to Step S32, determines the injection amount Gfuel_ln for during lean operation as the fuel injection amount Gfuel irrespective of the current operation mode, and then ends this processing. In the case of the determination in Step S31 being YES, the ECU advances to Step S33.

In Step S33, the ECU determines whether being in stoichiometric operation mode, i.e. whether being stoichiometric purification flag F_StoicMode=1. In the case of the determination in Step S33 being NO and being in lean operation mode, the ECU advances to Step S34, determines the injection amount Gfuel_ln for during lean operation as the fuel injection amount Gfuel, and then advances to Step S39. In the case of the determination in Step S33 being YES and being in stoichiometric operation mode, the ECU advances to Step S35.

In Step S35, the ECU executes the computations shown in formulas (11-1) to (16-4) above, identifies the values of the model parameters A and B, and then advances to Step S36. In Step S36, the ECU determines whether being a state suited to starting stoichiometric feedback control, i.e. whether being stoichiometric feedback flag F_StoicFB=1. In the case of the determination in Step S36 being NO, the ECU advances to Step S37, determines the injection amount Gfuel_st_ff for during stoichiometric operation mode start as the fuel injection amount Gfuel, and then advances to Step S39. In the case of the determination in Step S36 being YES, the ECU advances to Step S38, determines the injection amount Gfuel_st for during stoichiometric feedback control as the fuel injection amount Gfuel, and then advances to Step S39.

In Step S39, the ECU executes the computation shown in formulas (19) to (25-2) above, identifies the value of the delay coefficient C of the LAF sensor, and then advances to Step S40. In Step S40, the ECU determines whether the value of the correction factor Kc of the delay coefficient C is smaller than a predetermined abnormal judgment threshold Kc_Aged. In the case of the determination in Step S40 being NO, the ECU determines the LAF sensor as being normal, and ends this processing. In the case of the determination in Step S40 being YES, the ECU determines the LAF sensor as being in an abnormal state in which the delay is large, advances to Step S41, illuminates the warming lamp, and then ends this processing.

It should be noted that, as is evident by referencing the flowchart of FIG. 18, the LAF delay compensation identifier updates the value of the delay coefficient C irrespective of the operation mode; whereas, the feedback identifier updates the values of the model parameters A and B only in stoichiometric operation mode. In other words, the LAF delay compensation identifier updates the value of the delay coefficient C under wider operating conditions than the feedback identifier. As mentioned above, it is presumed that the value of the delay coefficient C is accurately identified in order for the values of the model parameters A and B to be accurately identified by the feedback identifier. Therefore, by making the operating conditions for identifying of the LAF compensation identifier wider than the feedback identifier in this way, i.e. by making to also include lean operation, the model parameters A and B can always be made accurate values.

Injection Pattern Control

Figure 19:
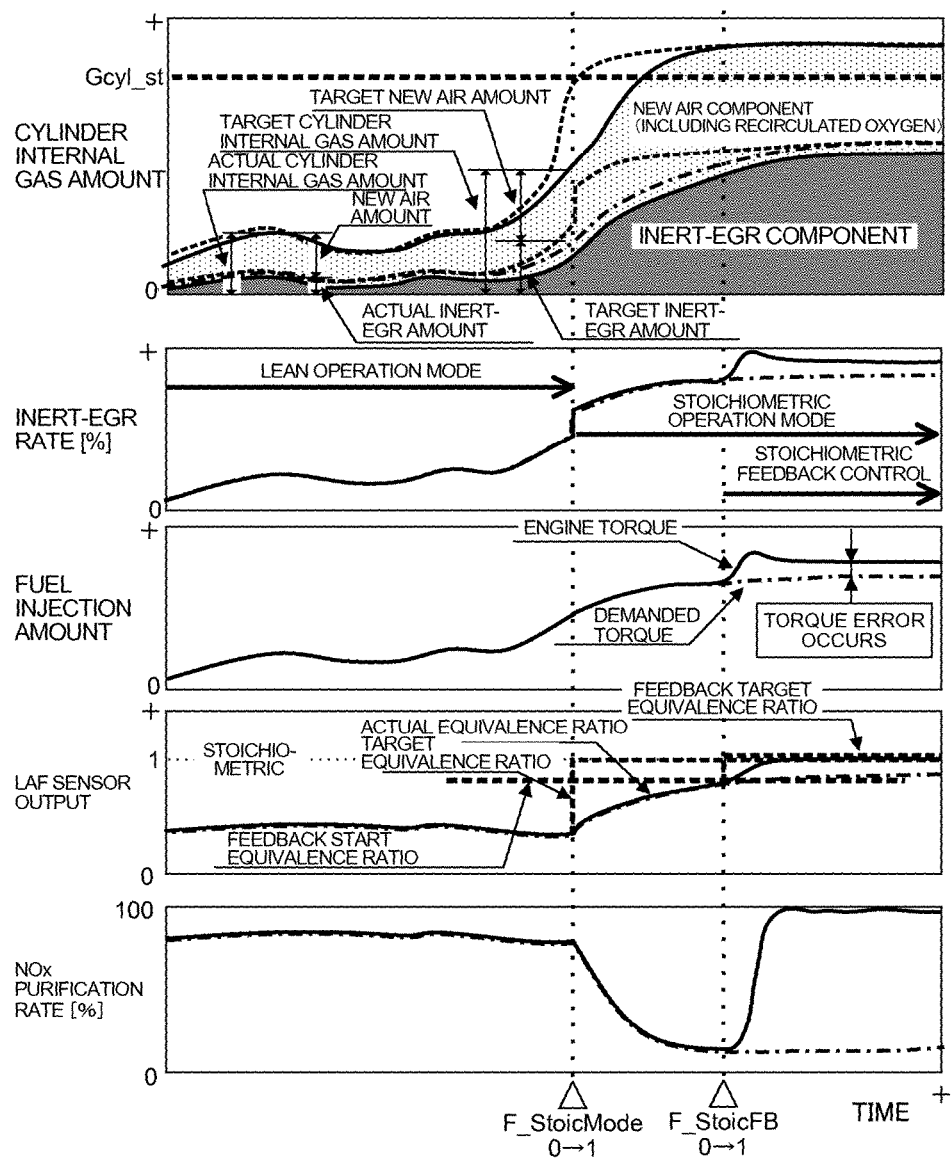
FIG. 19 provides graphs illustrating torque steps that can occur by the fuel injection control.

FIG. 19 provides graphs illustrating torque steps that can be generated by the aforementioned fuel injection control. More specifically, FIG. 19 provides graphs schematically showing the torque steps having a possibility to arise in the case of injecting fuel in the same injection situations before and after starting stoichiometric feedback control during stoichiometric operation mode.

As mentioned above, when starting stoichiometric feedback control, the fuel injection amount Gfuel is switched from feed-forward injection amount Gfuel_st_ff to the injection amount Gfuel_st for during stoichiometric feedback control. On this occasion, the injection amount Gfuel_st becomes larger than the feed-forward injection amount Gfuel_st_ff, so as to make the output of the LAF sensor approach stoichiometric from the leaner than stoichiometric side. For this reason, when injecting fuel in the same situation before and after the start of stoichiometric feedback control, an unintended torque step such as that illustrated may occur. Hereinafter, the sequence of injection pattern control for resolving such a torque step will be explained.

Figure 20:
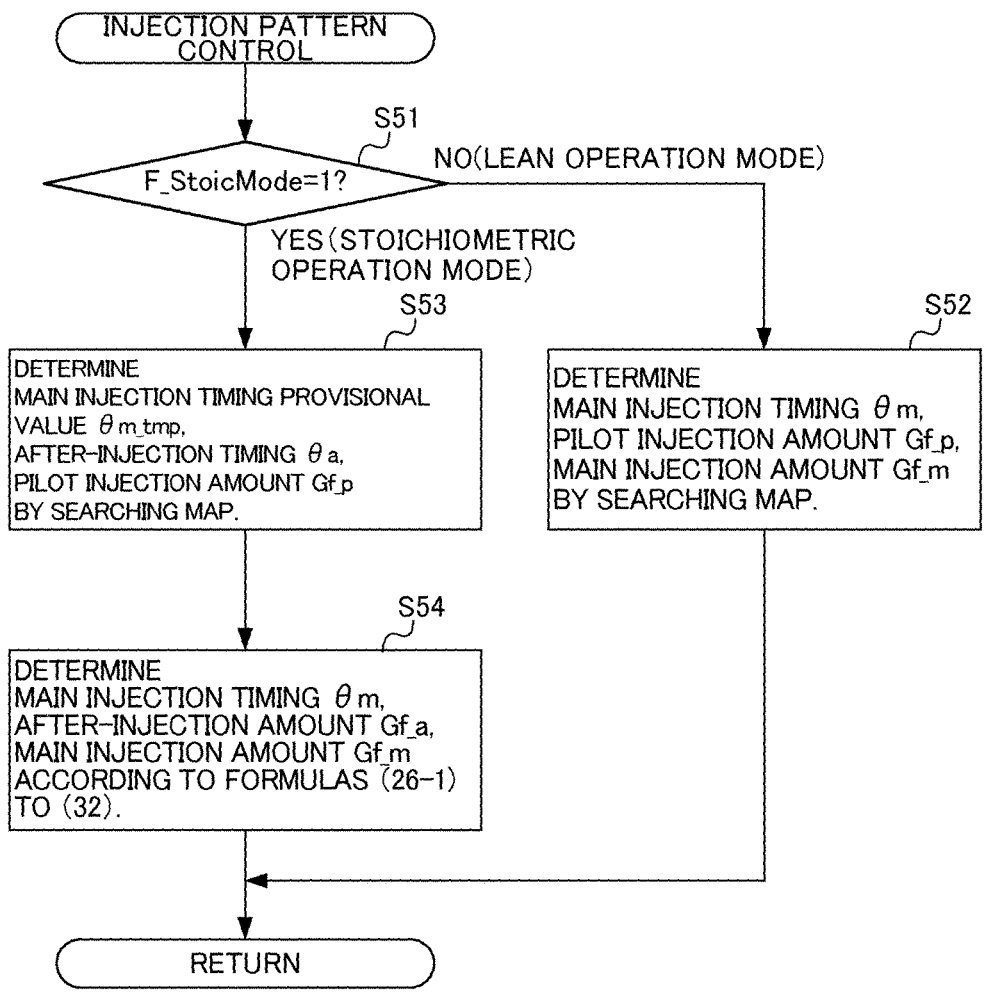
FIG. 20 is a flowchart showing the sequence of injection pattern control.

FIG. 20 is a flowchart showing the sequence of injection pattern control. In this injection pattern control, the ECU determines the injection pattern so as not to change the fuel injection amount Gfuel decided so as to optimize the equivalence ratio of exhaust gas in the above-mentioned fuel injection control, and such that the above-mentioned torque step does not occur. The injection pattern is characterized by a plurality of fuel injection parameters such as the main injection timing $\Theta m$ corresponding to the timing of executing main injection, after injection timing ea corresponding to the timing of executing after injection, pilot injection amount Gf_p corresponding to the fuel amount injected in pilot injection, main injection amount Gf_m corresponding to the fuel amount injected in main injection, and after injection amount Gf_a corresponding to the fuel amount injected in after injection. It should be noted that, for the pilot injection timing $\Theta p$ corresponding to the timing of executing pilot injection, a fixed value is used or a value uniquely decided depending on the above-mentioned fuel injection parameters, etc. is used; therefore, an explanation thereof is omitted hereinafter.

In Step S51, the ECU determines whether being in stoichiometric operation mode, i.e. whether the stoichiometric purification flag F_StoicMode is 1. In the case of the determination in Step S51 being NO and being in lean operation mode, the ECU advances to Step S52, and in the case of the determination in Step S51 being YES and being in stoichiometric operation mode, advances to Step S53.

In the case of being in lean operation mode, premised on executing only pilot injection and main injection as illustrated in FIG. 21, the ECU determines the value of the fuel injection parameters ($\Theta m$, Gf_m, Gf_p) related to execution of this pilot injection and main injection (Step S52), and then ends this processing. The main injection timing $\Theta m$ while in the lean operation mode, for example, is determined by searching the main injection timing determination map shown in FIG. 22, with the estimated value of the Inert-EGR rate (or estimated value Regr_hat of the EGR rate), etc. as arguments. According to the map illustrated in FIG. 22, the main injection timing $\Theta m$ is determined so as to be corrected to the advanced side in the vicinity of top-dead center, accompanying the Inert-EGR rate increasing. In addition, the main injection amount Gf_m and pilot injection amount Gf_p are decided by searching the map for during lean operation mode, so as to divide the fuel injection amount Gfuel decided in previous fuel injection amount control.

Figure 23:
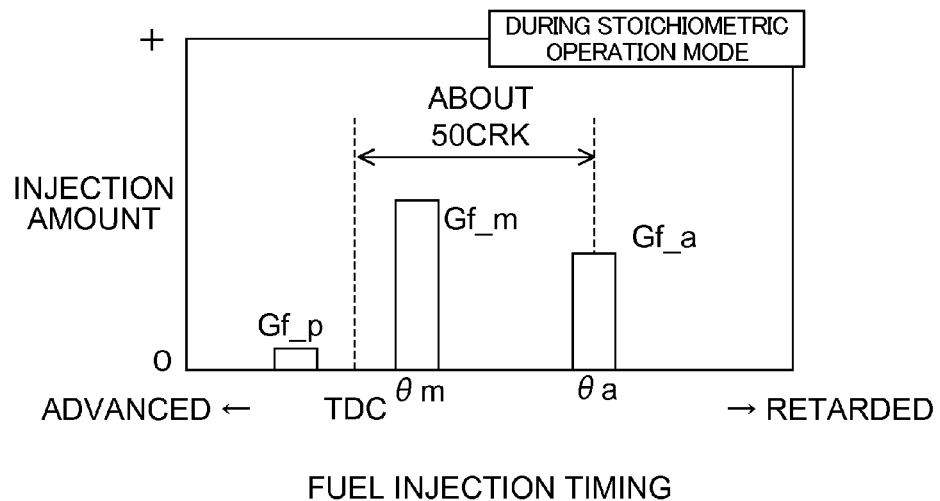
FIG. 23 is a graph showing an example of an injection pattern in the stoichiometric operation mode.
Figure 24:
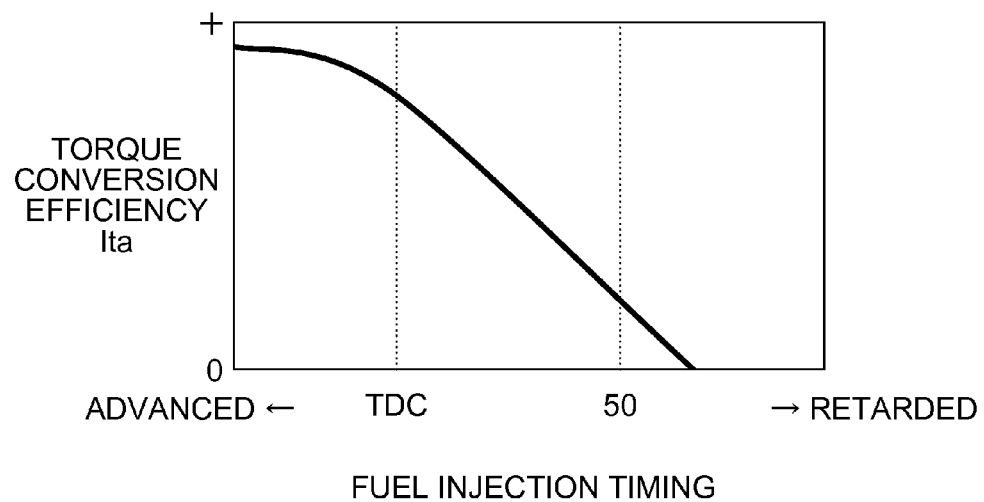
FIG. 24 is a graph showing an example of a map for calculating a torque conversion efficiency.
Figure 25:
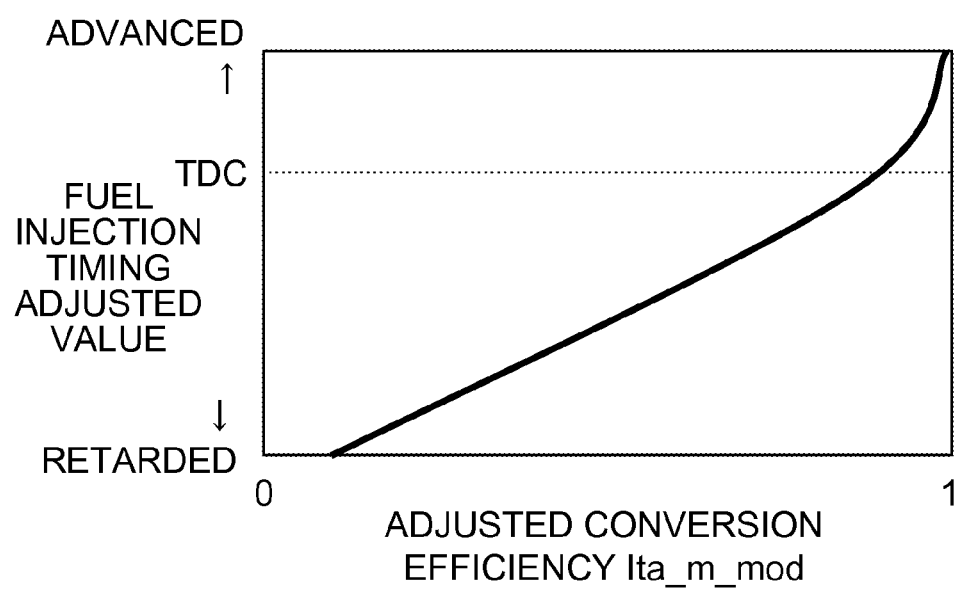
FIG. 25 is a graph showing a map for calculating a correction value of main injection timing.

In the case of being in stoichiometric operation mode, with the premise of executing pilot injection, main injection and after injection as illustrated in FIG. 23, the ECU determines the values of the fuel injection parameters ($\Theta m$, $\Theta a$, Gf_m, Gf_p, Gf_a) related to execution of this pilot injection, main injection and after injection in the sequence explained below (Steps S53, S54), and then ends this processing.

In Step S53, the ECU determines the values of a provisional value $\Theta m\_tmp$ of the main injection timing, after injection timing $\Theta a$ and pilot injection amount Gf_p. The provisional value $\Theta m\_tmp$ of the main injection timing is determined by searching the main injection timing determination map shown in FIG. 22, similarly to during lean operation mode. The after injection timing $\Theta a$ and pilot injection amount Gf_a are decided by searching a map for during stoichiometric operation mode.

In Step S54, the ECU determines the values of the main injection timing $\Theta m$, main injection amount Gf_m and after injection amount Gf_a, in the sequence shown below.

First, in order to determine the main injection amount Gf_m and after injection amount Gf_a so as to realize the driver required drive force Tdrv and so as to divide the fuel injection amount Gfuel decided in fuel injection control, the following two identities are imposed for the two injection amounts Gf_m and Gf_a. In formula (26-1) below, the coefficients Ita_m(k) and Ita_a(k) correspond to the torque conversion efficiencies of main injection and after injection, respectively, and are calculated by searching the map shown in FIG. 24 with the respective injection timing as arguments.

$$Tdrv(k) = \text{Ita\_m}(k)Gf\_m(k) + \text{Ita\_a}(k)Gf\_a(k) \quad (26\text{-}1)$$

$$Gfuel(k) = Gf\_p(k) + Gf\_m(k) + Gf\_a(k) \quad (26\text{-}2)$$

When solving formulas (26-1) and (26-2) above for the main injection amount Gf_m and after injection amount Gf_a, the formula below is derived.

$$Gf\_a(k) = \frac{Tdrv(k) - \text{Ita\_m}(k)(Gfuel(k) - Gf\_p(k))}{\text{Ita\_a}(k) - \text{Ita\_m}(k)} \quad (27\text{-}1)$$

$$Gf\_m(k) = \frac{-Tdrv(k) + \text{Ita\_a}(k)(Gfuel(k) - Gf\_p(k))}{\text{Ita\_a}(k) - \text{Ita\_m}(k)} \quad (27\text{-}2)$$

In addition, since after injection has poor torque conversion efficiency, when the after injection amount Gf_a becomes excessively large, the HC emission amount increases and oil dilution occurs. For this reason, the upper limit value Gf_a_max is set for the after injection amount Gf_a. Therefore, the ECU adjusts the provisional value Θm_tmp of the main injection timing so that the after injection amount Gf_a does not exceed the upper limit value Gf_a_max, and determines the values of the final main injection amount Gf_m and after injection amount Gf_a.

More specifically, the ECU first searches the map with the after injection timing Θa and the provisional value Θm_tmp of the main injection timing determined in Step S54 as arguments, and calculates the torque conversion efficiencies Ita_a_tmp and Ita_m_tmp of the provisional after injection and main injection. Then, the ECU calculates the provisional value Gf_a_tmp of the after injection amount and the provisional value Gf_m_tmp of the main injection amount shown in formulas (28-1) and (28-2) below, by substituting these torque conversion efficiencies Ita_a_tmp and Ita_m_tmp into formulas (27-1) and (27-2) above.

$$Gf\_a\_tmp(k) = \frac{Tdrv(k) - \text{Ita\_m\_tmp}(k)(Gfuel(k) - Gf\_p(k))}{\text{Ita\_a\_tmp}(k) - \text{Ita\_m\_tmp}(k)} \quad (28\text{-}1)$$

$$Gf\_m\_tmp(k) = \frac{-Tdrv(k) + \text{Ita\_a\_tmp}(k)(Gfuel(k) - Gf\_p(k))}{\text{Ita\_a\_tmp}(k) - \text{Ita\_m\_tmp}(k)} \quad (28\text{-}2)$$

The ECU compares the provisional value Gf_a_tmp of the after injection amount calculated and the upper limit value Gf_a_max, and in the case of the provisional value Gf_a_tmp being smaller than the upper limit value Gf_a_max, determines the provisional value Gf_a_tmp as the definite value Gf_a(k) of the after injection amount, and in the case of the provisional value Gf_a_tmp being at least the upper limit value Gf_a_max, determines the upper limit value Gf_a_max as the definite value Gf_a(k) of the after injection amount (refer to formula (29) below).

$$Gf\_a(k) = \begin{cases} Gf\_a\_tmp(k) & (Gf\_a\_tmp(k) < Gf\_a\_max) \\ Gf\_a\_max & (Gf\_a\_tmp(k) \geq Gf\_a\_max) \end{cases} \quad (29)$$

In addition, in the case of the provisional value Gf_a_tmp of the after injection amount being smaller than the upper limit value Gf_a_max, the ECU determines the provisional value Gf_m_tmp as the definite value Gf_m(k) of the main injection amount, and in the case of the provisional value Gf_a_tmp being at least the upper limit value Gf_a_max, determines an correction value Gf_m_mod as the definite value Gf_m(k) of the main injection amount (refer to formula (30-1) below). Herein, for the correction value Gf_m_mod(k) of the main injection amount, a value arrived at by increasing the post injection amount by an amount limited by the upper limit value Gf_a_max is used, as shown in formula (30-2) below.

$$Gf\_m(k) = \begin{cases} Gf\_m\_tmp(k) & (Gf\_a\_tmp(k) < Gf\_a\_max) \\ Gf\_m\_mod(k) & (Gf\_a\_tmp(k) \geq Gf\_a\_max) \end{cases} \quad (30\text{-}1)$$

$$Gf\_m\_mod(k) = Gfuel(k) - Gf\_p(k) - Gf\_a\_max \quad (30\text{-}2)$$

In addition, in the case of the provisional value Gf_a_tmp of the after injection amount being smaller than the upper limit value Gf_a_max, the ECU determines the provisional value Θm_tmp as the definite value Θm(k) of the main injection timing, and in the case of the provisional value Gf_a_tmp being at least the upper limit value Gf_a_max, determines the correction value Θm_mod as the definite value Θm(k) of the main injection timing (refer to formula (31) below).

$$\theta m(k) = \begin{cases} \theta m\_tmp(k) & (Gf\_a\_tmp(k) < Gf\_a\_max) \\ \theta m\_mod(k) & (Gf\_a\_tmp(k) \geq Gf\_a\_max) \end{cases} \quad (31)$$

Herein, the correction value Θm_mod(k) of the main injection timing is calculated in the following sequence. First, in the case of limiting the after injection amount Gf_a by the upper limit value Gf_a_max, for the main injection amount Gf_m, the correction value Gf_m_mod arrived at by increasing in proportion thereto is used. By determining the injection amount in this way, the torque conversion efficiency Ita_m_mod of the main injection required is calculated from formula (26-1) above (refer to formula (32) below). When this is done, the correction value Θm_mod of the main injection timing is determined by searching the map shown in FIG. 25 with the torque conversion efficiency Ita_m_mod as an argument. It should be noted that the map of FIG. 25 corresponds to a map made by substituting the input and output of the map shown in FIG. 24, and is substantially equivalent. Therefore, in a case such that the provisional value Gf_a_tmp of the after injection amount exceeding the upper limit value Gf_a_max, the after injection amount is limited by the upper limit value Gf_a_max, the main injection amount is adjusted to the increased amount side from the provisional value Gf_m_tmp in proportion thereto, and the main injection timing is adjusted from the provisional value Θm_tmp to the retarded side so that the combustion efficiency declines.

$$\text{Ita\_m\_mod}(k) = \frac{Tdrv(k) - \text{Ita\_a}(k)(Gfuel(k) - Gf\_p(k))}{Gf\_m\_mod(k)} \quad (32)$$

Figure 26:
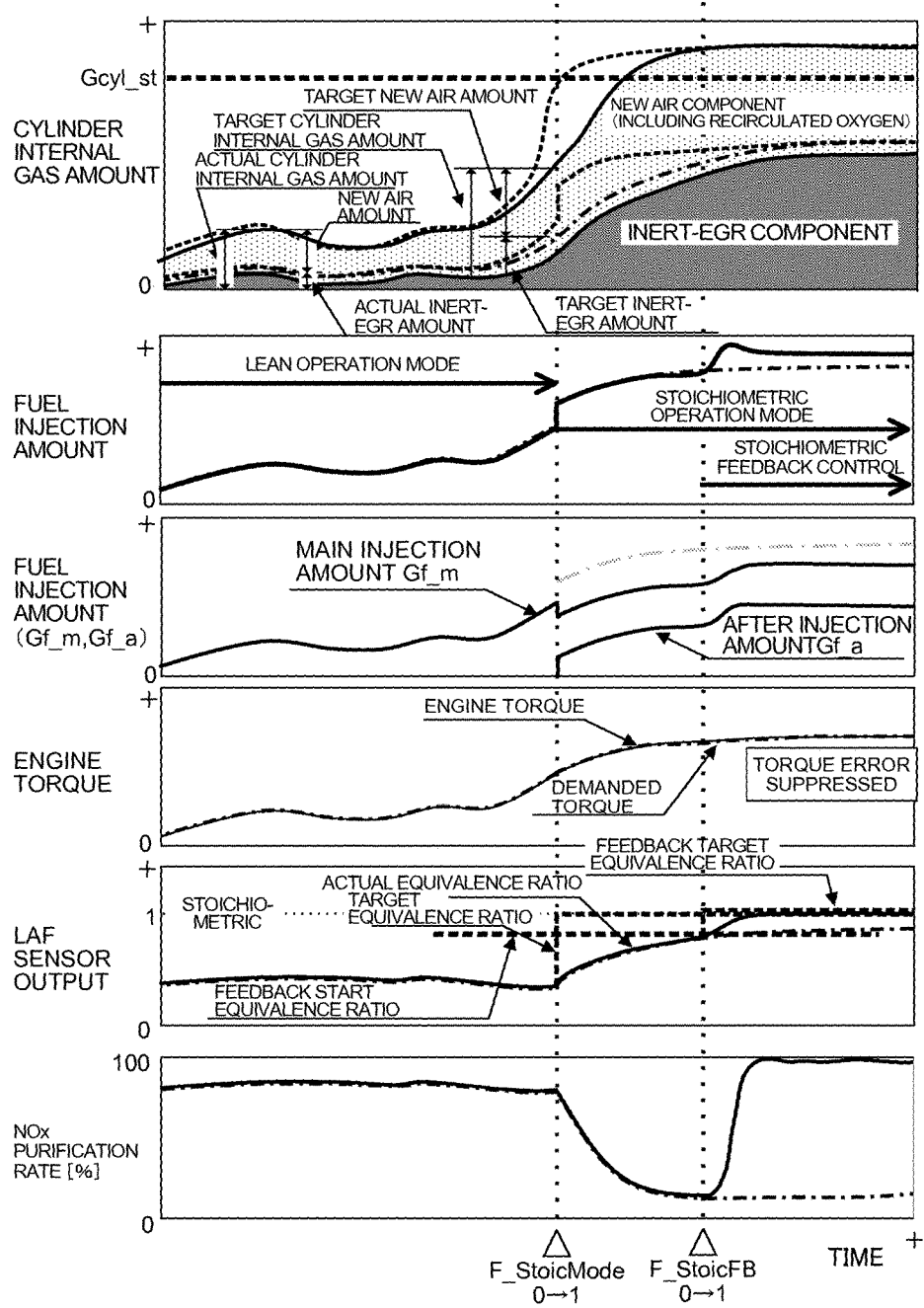
FIG. 26 provides graphs illustrating the concept of torque compensation control realized by executing injection pattern control.

FIG. 26 provides graphs illustrating the concept of torque compensation control realized by executing the aforementioned injection pattern control.

First, when switching from the lean operation mode to stoichiometric operation mode, after injection is executed in addition to main injection. Subsequently, when the stoichiometric feedback control starts, the fuel injection amount is increased so that the output of the LAF sensor becomes stoichiometric from the lean side. On this occasion, the fuel injection amount decided so that the equivalence ratio becomes stoichiometric is appropriately divided into the after injection amount and main injection amount following formulas (26-1) to (32) above. It is thereby possible to suppress a torque step from occurring, while controlling to an equivalence ratio such that the three-way purification reaction progresses on the direct-downstream catalyst.

Modified Example

Hereinafter, a modified example of the feedback identifier of the above-mentioned embodiment will be explained.

Figure 27:
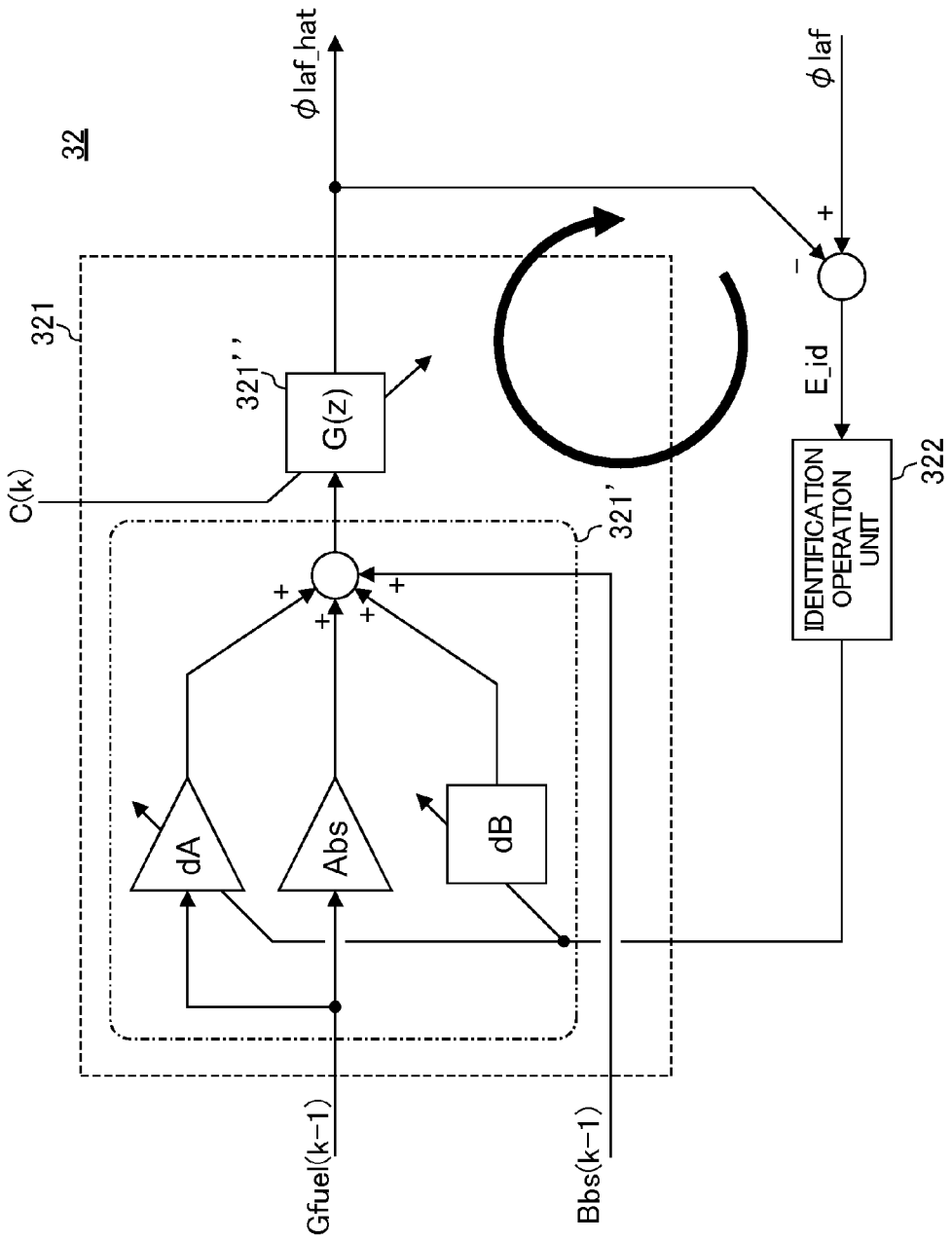
FIG. 27 is a block diagram showing the sequence of computations in a feedback identifier related to the embodiment.

FIG. 27 is a block diagram showing the sequence of computations (refer to formulas (11-1) to (16-4) above) of a feedback identifier 32 of the above-mentioned embodiment.

The feedback identifier 32 is configured to include: the LAF sensor output estimation operation unit 321 that calculates the estimated value φlaf_hat(k) of the LAF sensor output according to formulas (11-1) and (11-2) using the injection amount-sensor output model including the model parameters A,B and response delay coefficient C with the fuel injection amount Gfuel (k−1) and reference value Bbs (refer to formula (9-4)) as inputs; and the identification operation unit 322 that successively identifies the values A(k), B(k) of the two model parameters so that the identification error E_id(k) between the estimated value φlaf_hat (k) and output value φlaf(k) of the LAF sensor (refer to formula (12)) reaches a minimum, by way of the sequence explained by referencing formulas (13) to (16-4) above.

The feedback identifier 32 identifies the values A(k), B(k) of the model parameters (more strictly, the correction values dA, dB thereof), by repeatedly performing the computation of the LAF sensor output estimation operation unit 321 and the computation of the identification operation unit 322 as shown by the arrow in FIG. 27, using the delay coefficient C(k) identified by the LAF delay compensation identifier 35 provided separately thereto.

At this time, the computation in the LAF sensor output estimation operation unit 321 is separated into computation 321' calculating the estimated value φexp_hat of the equivalence ratio of exhaust gas according to formula (11-1) including the model parameters A, B with the fuel injection amount Gfuel(k−1) as an input, and computation 321" of formula (11-2) including the delay coefficient C with this estimated value φexp_hat of the equivalence ratio of exhaust gas as an input, as shown in FIG. 27. Therefore, as is evident from this figure, with the feedback identifier 32, it is necessary to sufficiently delay the identification speed of the identification operation unit 322 so that the computation of values A(k), B(k) of the model parameters does not become unstable (corresponding to component of gain matrix P in formula (16-3) above), considering the response delay of factor G(z) and dead time, from passing through the computation of low-pass filter factor G(z) upon one time of updating the values A(k), B(k) of the model parameters. In other words, there is a limit to the identification speed of the values A(k), B(k) of the model parameters of the feedback identifier 32.

Figure 28:
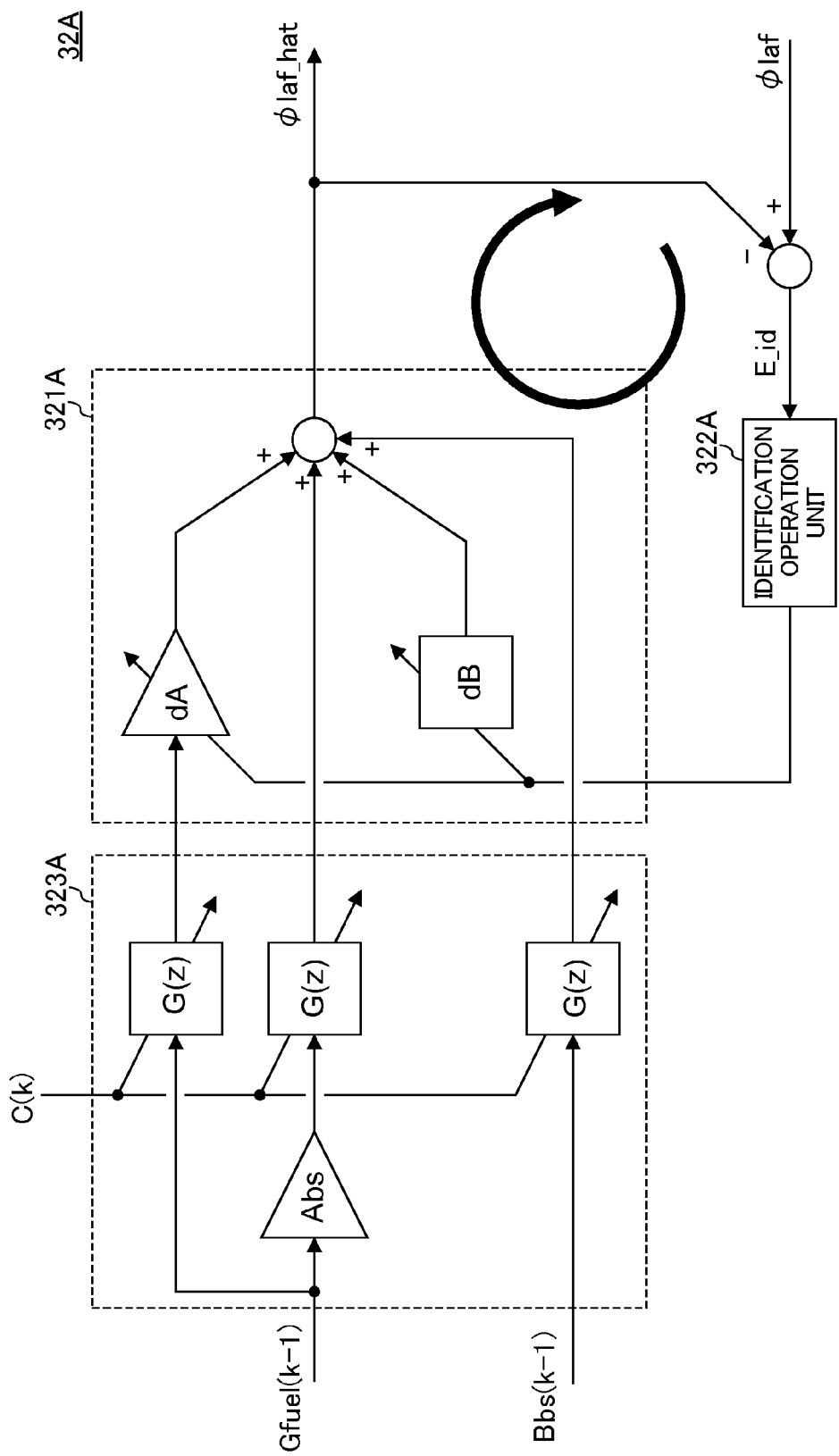
FIG. 28 is a block diagram showing the sequence of operations in a modified example of the feedback identifier.

FIG. 28 is a block diagram showing the sequence of computations in a modified example of the feedback identifier 32A configured to improve such identification speed. This feedback identifier 32A is obtained by making equivalent transformation of the feedback identifier 32 of FIG. 27.

The feedback identifier 32A is configured to include a delay operation unit 323A that performs delay computation characterized by the delay coefficient C on the fuel injection amount Gfuel(k−1) and reference value Bbs, the LAF sensor output estimation operation unit 321A that calculates the estimated value φlaf_hat(k) of the output of the LAF sensor by performing predetermined computation characterized by the model parameters A, B on the output of this delay operation unit 323A, and an identification operation unit 322A that successively identifies the values A(k), B(k) of the two model parameters so that the identification error E_id(k) (refer to formula (12)) between the estimated value φlaf_hat (k) and the output value φlaf(k) of the LAF sensor reaches a minimum.

The delay operation unit 323A calculates the below-described filter values AG_f(k), Bbs(k) and Gf_f(k) by performing the delay computation (refer to formulas (33-1) to (33-3) below) using the delay coefficient C(k) identified by the LAF delay compensation identifier 35, for the fuel injection amount Gfuel, the value Gfuel·Abs obtained by multiplying the reference value by the fuel injection amount, and reference value Bbs.

$$AG\_f(k)=(1-C(k-1))AG\_f(k-1)+C(k-1)Abs(k-d'-1)\ Gfuel(k-d'-1) \quad (33\text{-}1)$$

$$Bbs\_f(k)=(1-C(k-1))Bbs\_f(k-1)+C(k-1)Bbs(k-d'-1) \quad (33\text{-}2)$$

$$Gf\_f(k)=(1-C(k-1))Gf\_f(k-1)+C(k-1)Gfuel(k-d'-1) \quad (33\text{-}3)$$

The LAF sensor output estimation operation unit 321A calculates the estimated value φlaf_hat(k) of the output of the LAF sensor, by performing the computation shown in formula (34) below characterized by the correction values dA, dB of the model parameters A, B on these filter values AG_f(k), Bbs(k) and Gf_f(k).

$$\varphi laf\_\text{hat}(k)=AG\_f(k)+dA(k-1)Gf\_f(k)+Bbs(k)+dB(k-1) \quad (34)$$

The identification operation unit 322A successively identifies the correction values dA(k), dB(k) of the two model parameters so that the identification error E_id between the output value φlaf(k) of the LAF sensor and the estimated value φlaf_hat(k) of the LAF sensor output derived from model formulas (11-1) and (11-2) above reaches a minimum. However, as shown in formula (34), since a term that is not proportional to either of the correction values dA, dB of the model parameters exists in the estimated value φlaf_hat(k), the identification error E_id is defined as shown in formula (12) above, and the correction values dA(k), dB(k) cannot be identified directly so that this error becomes a minimum. Therefore, for convenience in computation, the identification operation unit 322A defines a virtual output V(k) obtained by subtracting the right-side constant term AG_f(k) in formula (34) above and Bbs(k) from the output value φlaf(k) of the LAF sensor (refer to formula (35-1) below), and the estimated value V_hat(k) of this virtual output V(k) (refer to formula (35-2) below), without directly handling the output of the LAF sensor, and uses the identification error E_id"(k) defined by the deviation of these (refer to formula (35-3) below).

$$V(k)=\varphi laf(k)-AG\_f(k)-Bbs\_f(k) \quad (35\text{-}1)$$

$$V\_\text{hat}(k)=dA(k-1)Gf\_f(k)+dB(k-1) \quad (35\text{-}2)$$

$$E\_id''(k)=V(k)-V\_\text{hat}(k) \quad (35\text{-}3)$$

Figure 29:
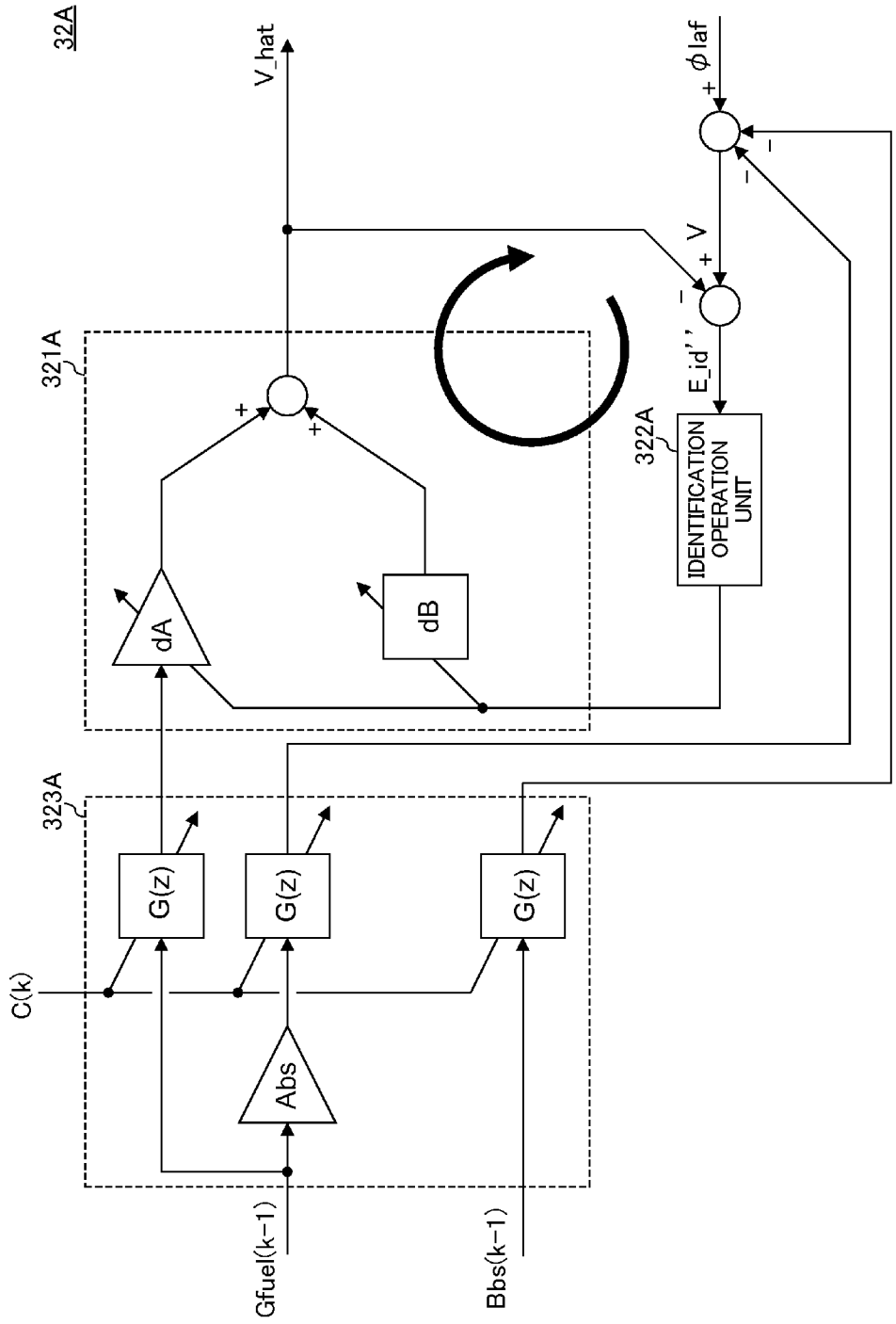
FIG. 29 is a block diagram obtained by equivalent transformation of FIG. 28.

It should be noted that redefining from this identification error E_id to E_id" is equivalent to rewriting the block diagram shown in FIG. 28 as the block diagram shown in FIG. 29, and the obtained results are also equal.

The identification operation unit 322A defines the adjusted vector dΘ' with the correction values dA, DB of the model parameters A, B as components by formula (36-1) below, and defines the input/output vector ς by formula (36-2) below.

$$d\Theta'(k) = [dA(k), dB(k)] \tag{36-1}$$

$$\varsigma'^T(k) = [Gf\_f(k), 1] \tag{36-2}$$

Under the above definitions, the adjusted vector $d\Theta'$ making the identification error $E\_id''(k)$ a minimum is calculated by formula (37) below similarly to formula (15) above, according to a successive-type least-squares method algorithm.

$$d\theta'(k) = \begin{cases} \Lambda' d\theta'(k-1) + Kp'(k) E\_id''(k) & (\text{F\_StoicMode}(k) = 1) \\ [0, 0] & (\text{F\_StoicMode}(k) = 0) \end{cases} \tag{37}$$

Herein, the matrix $\Lambda'$ is a forgetting matrix, and is defined by formula (38-3) below. The diagonal components $\lambda 1'$, $\lambda 2'$ of the forgetting matrix $\Lambda'$ are set between 0 and 1, respectively. In addition, either of $\lambda 1'$, $\lambda 2'$ is preferably set to 1.

In addition, the matrix $Kp'$ is a model parameter updated gain matrix, and is defined by formula (38-1) below. In this formula (38-1), the matrix $P'$ is an adaptive gain matrix, and is defined by formula (38-2) below. The diagonal components $p1'$, $p2'$ of the adaptive gain matrix $P'$ are set to positive values, respectively.

$$KP'(k) = \frac{P'\varsigma'(k)}{1 + \varsigma'^T(k) P' \varsigma'(k)} \tag{38-1}$$

$$P' = \begin{bmatrix} p1' & 0 \\ 0 & p2' \end{bmatrix} \tag{38-2}$$

$$\Lambda' = \begin{bmatrix} \lambda 1' & 0 \\ 0 & \lambda 2' \end{bmatrix} \tag{38-3}$$

The identification operation unit 322A identifies the correction values dA, dB of the model parameters A,B so as to make the redefined identification error $E\_id''$ a minimum, by way of the above such arithmetic expression. It should be noted that the values of the model parameters A, B are calculated from formulas (9-1) and (9-2). According to the feedback identifier 32A shown in FIGS. 28 and 29 explained above, contrary to the feedback identifier 32 shown in FIG. 27, since the filter element G(z) does not exist within the computation loop of the model parameters A(k), B(k), it is possible to improve the identification speed of the identification operation unit 322A.

It should be noted that, although an example of the under-floor catalyst being established as a selective reduction catalyst is explained in the above-mentioned embodiments, the present invention is not limited thereto. The under-floor catalyst is effective in the above-mentioned way even as a NOx storage reduction-type catalyst.

Figure 30:
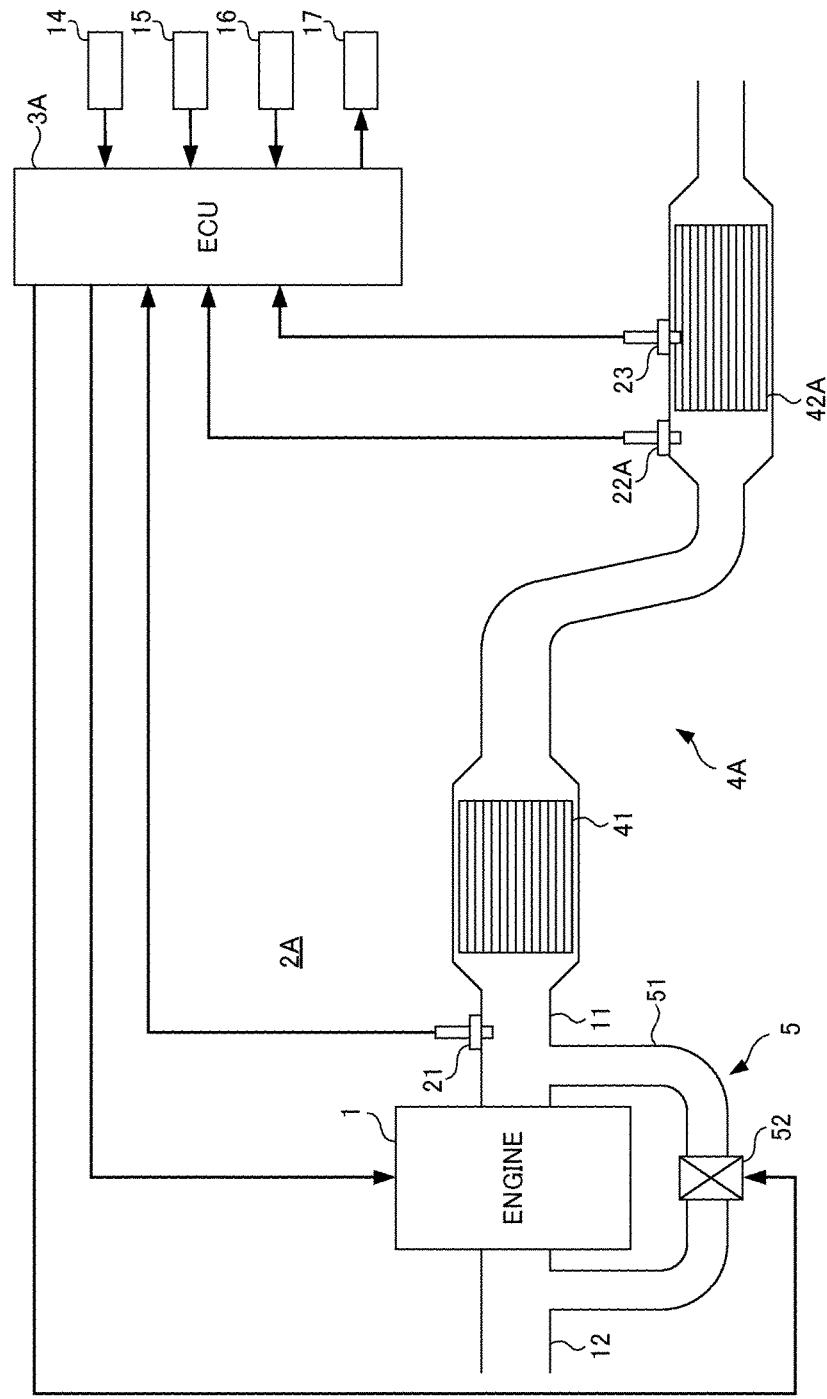
FIG. 30 is a view showing the configuration of an exhaust purification system in the case of establishing the under-floor catalyst as a NOx storage reduction-type catalyst.

FIG. 30 is a view showing the configuration of an exhaust purification system 2A in the case of establishing the under-floor catalyst of the under-floor catalytic converter 42A as a NOx storage reduction-type catalyst. With the exhaust purification system 2 of the above-mentioned embodiment, the reducing agent supply device 43 is required for supplying reducing agent to the selective reduction catalyst. However, since the NOx storage reduction-type catalyst uses HC in the exhaust gas as reducing agent, with this exhaust purification system 2A, it is not necessary to provide the reducing agent supply device. However, with this exhaust purification system 2A, it is necessary for the ECU 3A to execute, as appropriate separately from the equivalence ratio control explained in the above-mentioned embodiment, equivalence ratio control to make the equivalence ratio of the exhaust gas stoichiometric or to the rich side from stoichiometric, in order to reduce NOx adsorbed by the NOx storage reduction-type catalyst. Since the timing of executing such equivalence ratio control for reducing NOx is determined by the ECU 3A in the exhaust purification system 2A, the LAF sensor (or oxygen concentration sensor) 22A is provided on the upstream side of the under-floor catalytic converter 43A. In addition, with an exhaust purification system such as that shown in FIG. 30, in a case of using a NOx storage reduction-type catalyst also in the direct-downstream catalyst, i.e. in a case of using a NOx storage reduction catalyst in both the direct-downstream catalyst and under-floor catalyst, this direct-downstream catalyst and under-floor catalyst may be configured to be integrated.

Figure 31:
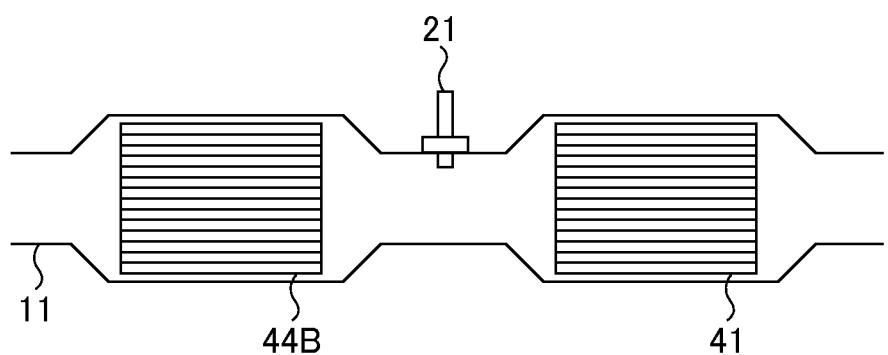
FIG. 31 is a view showing an example made providing an oxidation catalyst (or three-way catalyst) on an upstream side of the LAF sensor.

In addition, as mentioned above, the output characteristic of the LAF sensor changes from soot adhering to the detection element thereof. Therefore, the oxidation catalyst (or three-way catalyst) 44B may be further provided to the upstream side of the LAF sensor 21, as shown in FIG. 31, in order to prevent such adherence of soot to the detection element.

In addition, although an example establishing the engine as a diesel engine is explained in the above-mentioned embodiment, the present invention is not limited thereto, and may be configured as a gasoline engine of lean-combustion type.

In addition, although an injection amount-sensor output model (refer to formulas (8) to (10)) with the fuel injection amount Gfuel as the input is defined in the above-mentioned embodiment, the input of the model is not limited to the fuel injection amount itself, and may be a physical amount obtained from the fuel injection amount through a predetermined computation. For example, a model may be defined with a new physical amount Kg(k) defined by dividing the fuel injection amount Gfuel(k) by a predetermined map value (feed-forward injection amount Gfuel_st_ff) as the input (refer to formula (39) below).

$$Kg(k) = Gfuel(k)/Gfuel\_st\_ff(k) \tag{39}$$

In the case of establishing the above-mentioned physical amount Kg(k) as the input in place of the fuel injection amount Gfuel(k), the model formula of formula (8) above is replaced by formula (40-1) below. In addition, in this case, the definitional equation (9-1) of the model parameter A'(k) is replaced by formula (40-2) below, and the definitional equation (9-3) of the reference value Abs'(k) of the model parameter A'(k) is replaced by formula (40-3) below.

$$\varphi \exp(k+1) = A'(k) Kg(k) + B(k) \tag{40-1}$$

$$A'(k) = \text{Abs}'(k) + dA(k) \tag{40-2}$$

$$\text{Abs}'(k) = \frac{\alpha st(1 - \text{Regr\_trgt}(k)) Gfuel\_st\_ff}{Gafs(k)} \tag{40-3}$$

In the above way, even if defining a new physical amount Kg from the fuel injection amount Gfuel and establishing this as the input of the model, it is possible to obtain similar results by redefining various parameters as shown in formulas (40-1) to (40-3) above as appropriate. In addition, the same matter as this similarly holds true for the output of the model. In other words, although the injection amount-sensor output model (refer to formulas (8) to (10)) with the output φlaf of the LAF sensor as the output is defined, the output of the model is not limited to the output itself of the LAF sensor, and may be a physical amount obtained from the output of the LAF sensor through a predetermined computation. For example, the air-fuel ratio obtained by multiplying a factor (e.g., 14.5) by the reciprocal of the output of the LAF sensor may be established as the output of the model.

The invention claimed is:

1. A control device of an internal combustion engine to control an equivalence ratio of an air-fuel mixture of the internal combustion engine, comprising:
    a fuel injection valve which injects fuel to a cylinder of the internal combustion engine;
    an exhaust gas sensor which detects an equivalence ratio of exhaust gas of the internal combustion engine;
    a first identifying unit which models a system from a fuel injection amount of the fuel injection valve to an output of the exhaust gas sensor, as an injection amount-sensor output model with a first model formula including first model parameters and a second model formula including a second model parameter, and which successively identifies values of the first model parameters;
    a second identifying unit which models a system from an output value of the first model formula to the output of the exhaust gas sensor as a port equivalence ratio-sensor output model with the second model formula, and which successively identifies a value of the second model parameter based on the output of the exhaust gas sensor;
    a controller which determines a value of the fuel injection amount of the fuel injection valve based on the first model parameters; and
    an electronic control unit which drives the fuel injection valve so that the fuel injection amount determined by the controller is realized,
    wherein the first model formula outputs an equivalence ratio of the exhaust gas in an exhaust port of the internal combustion engine based on the fuel injection amount and the first model parameters,
    wherein the second model formula outputs the output of the exhaust gas sensor based on the equivalence ratio of the exhaust port and the second model parameter,
    wherein the first identifying unit updates the values of the first model parameters while the internal combustion engine is under a specific first operating condition and does not update the values of the first model parameters while the internal combustion engine is not under the first operating condition, and
    wherein the second identifying unit updates the value of the second model parameter while the internal combustion engine is under a second operating condition of which range is wider than that of the first operating condition.

2. The control device of an internal combustion engine according to claim 1,
    wherein the second identifying unit updates the value of the second model parameter at least during variation of the output of the exhaust gas sensor.

3. The control device of an internal combustion engine according to claim 1, further comprising: an abnormality determining unit which determines abnormality of the exhaust gas sensor owing to comparison between the value of the second model parameter identified by the second identifying unit and a predetermined threshold value for abnormality determination,
    wherein the second model parameter is a parameter regarding a detection delay characteristic of the exhaust gas sensor.

4. The control device of an internal combustion engine according to claim 1, wherein the first identifying unit includes:
    a sensor output estimation operation unit that calculates an estimated value of the output of the exhaust gas sensor with the fuel injection amount as an input, according to the first model formula and the second model formula of the injection amount-sensor output model including the first model parameters and the second model parameter; and
    an identification operation unit that identifies values of the first model parameters so as to minimize error between the estimated value and the output of the exhaust gas sensor.

5. The control device of an internal combustion engine according to claim 1, wherein the second model parameter is a parameter related to a detection delay characteristic of the exhaust gas sensor, and
    wherein the first identifying unit includes:
    a delay operation unit that performs delay calculation characterized by the second model parameter on the fuel injection amount;
    a sensor output estimation operation unit that calculates an estimated value of the output of the exhaust gas sensor by performing a predetermined operation characterized by the first model parameters on an output of the delay operation unit; and
    an identification operation unit that identifies values of the first model parameters so as to minimize error between the estimated value and the output of the exhaust gas sensor.

6. The control device of an internal combustion engine according to claim 2, further comprising: an abnormality determining unit which determines abnormality of the exhaust gas sensor owing to comparison between the value of the second model parameter identified by the second identifying unit and a predetermined threshold value for abnormality determination,
    wherein the second model parameter is a parameter regarding a detection delay characteristic of the exhaust gas sensor.

7. The control device of an internal combustion engine according to claim 2, wherein the first identifying unit includes:
    a sensor output estimation operation unit that calculates an estimated value of the output of the exhaust gas sensor with the fuel injection amount as an input, according to the first model formula and the second model formula of the injection amount-sensor output model including the first model parameters and the second model parameter; and
    an identification operation unit that identifies values of the first model parameters so as to minimize error between the estimated value and the output of the exhaust gas sensor.

8. The control device of an internal combustion engine according to claim 2, wherein the second model parameter is a parameter related to a detection delay characteristic of the exhaust gas sensor, and
    wherein the first identifying unit includes:
    a delay operation unit that performs delay calculation characterized by the second model parameter on the fuel injection amount;

a sensor output estimation operation unit that calculates an estimated value of the output of the exhaust gas sensor by performing a predetermined operation characterized by the first model parameters on an output of the delay operation unit; and an identification operation unit that identifies values of the first model parameters so as to minimize error between the estimated value and the output of the exhaust gas sensor.

* * * * *